United States Patent
Hilario et al.

(10) Patent No.: US 10,535,101 B2
(45) Date of Patent: Jan. 14, 2020

(54) SYSTEM AND METHOD FOR PROCESSING DATA RELATED TO LAST SURVIVOR LIFE INSURANCE POLICIES

(75) Inventors: Shawn P. Hilario, West Hartford, CT (US); Edwin C. Barron, Suffield, CT (US)

(73) Assignee: The Prudential Insurance Company of America, Newark, NJ (US)

( * ) Notice: Subject to any disclaimer, the term of this patent is extended or adjusted under 35 U.S.C. 154(b) by 539 days.

(21) Appl. No.: 13/169,773

(22) Filed: Jun. 27, 2011

(65) Prior Publication Data

US 2012/0330687 A1 Dec. 27, 2012

(51) Int. Cl.
*G06Q 40/08* (2012.01)
(52) U.S. Cl.
CPC .................... *G06Q 40/08* (2013.01)
(58) Field of Classification Search
CPC .............. G06Q 40/00; G06Q 40/08
USPC ............................................. 705/4
See application file for complete search history.

(56) References Cited

U.S. PATENT DOCUMENTS

| | | | | |
|---|---|---|---|---|
| 5,655,085 | A * | 8/1997 | Ryan | G06Q 40/02 705/4 |
| 5,926,800 | A | 7/1999 | Baronowski et al. | |
| 7,260,548 | B1 | 8/2007 | Allsup | |
| 7,324,950 | B2 | 1/2008 | Sherman | |
| 7,457,776 | B1 | 11/2008 | Caruso et al. | |
| 8,271,301 | B1 * | 9/2012 | Nordyke et al. | 705/4 |
| 2002/0103678 | A1 | 8/2002 | Burkhalter et al. | |
| 2003/0120521 | A1 * | 6/2003 | Sherman | 705/4 |
| 2003/0163393 | A1 * | 8/2003 | Mittal | G06Q 10/087 705/26.5 |
| 2004/0064391 | A1 * | 4/2004 | Lange | G06Q 40/02 705/36 R |
| 2005/0086085 | A1 * | 4/2005 | Berlin et al. | 705/4 |
| 2007/0168233 | A1 | 7/2007 | Hymel | |
| 2007/0185741 | A1 | 8/2007 | Hebron et al. | |
| 2008/0147447 | A1 | 6/2008 | Roche et al. | |
| 2008/0167903 | A1 | 7/2008 | Hall et al. | |
| 2010/0305976 | A1 | 12/2010 | Fischer et al. | |

OTHER PUBLICATIONS

Emma Thelwell, How to protect yourself if illness strikes, Oct. 14, 2006, The Daily Telegraph, p. 5.

(Continued)

*Primary Examiner* — Robert R Niquette
*Assistant Examiner* — Liz P Nguyen
(74) *Attorney, Agent, or Firm* — Baker Botts L.L.P.

(57) ABSTRACT

A computer system for processing data related to last survivor life insurance policies includes a processor configured to process data related to a last survivor policy on two or more insureds, associated single life policies on the two or more insureds, and one or more ancillary benefits. The processing of data may include generation of illustrations, processing of applications, underwriting of applications, and generation of policy documents, employing common data for the last survivor policy and the one or more associated single life policies. The ancillary benefits may include payments based on a medical condition of an insured, payments based on longevity of an insured, and payments based on disability of an insured.

22 Claims, 12 Drawing Sheets

(56) References Cited

OTHER PUBLICATIONS

Faith Archer, A long spell off work can wreck your finances, Apr. 15, 2006, The Daily Telegraph, p. 5.
Richard Dyson, The mother who refused to give up, Mar. 19, 2006, Mail on Sunday, p. 13.
Unknown, CIGNA Introduces Insurance for Coping with Critical Illness, Apr. 29, 1998, PRNewswire, p. 1.
Roger J. Stalowicz, Critical Illness Life Insurance : Innovation to address a need, Sep. 1998, Journal of the American Society of CLU & ChFC, vol. 52, Issue 5, p. 54.
Harvey W. Rubin, Dictionary of Insurance Terms, 2000, Barron's Educational Series, Inc., Fourth Edition, p. 136-137.
Michael M. Flynn, CLU; "Universal Life Secondary Guarentees"; http://www.faiuonline.com/FinancialPro%20Viewpoints-Universal%20Life.pdf; Sep. 2004 (Accessed Dec. 9, 2009).
Estate Planning, www.insbuyer.com/estate_planning_life_insurance.htm (Accessed Apr. 9, 2009).

* cited by examiner

Edit Illustration : Hartford Bicentennial UL Joint Freedom II

Insured | Case Input | LifeAccess | Results | Reports

☑ First Insured's Single Life Policy
Face Amount: $500,000
☑ LifeAccess Accelerated Benefit Rider    LifeAccess Specified % 100%
☐ Longevity Rider ☑ Second Insured's Single Life Policy
Face Amount: $500,000
☑ LifeAccess Accelerated Benefit Rider    LifeAccess Specified % 100%
☑ Longevity Rider Product Choice: Hartford Bicentennial UL Freedom ▷

By design, this concept is stream-lined and does not allow for editing on the single life illustrations. For more complex case designs, enter each illustration separately outside of the "LifeAccess with Last Survivor" concept.

[ Calculate ]    [ Compare Results ]    [ Cancel ]

Hartford Insurance Companies [Merlin Advanced] - [LifeAccess with Last Survivor Composite]

File  View  Edit  Compare  Tools  Options  Window  About

Edit | Pdf | Page | ◁Page | ◁Report | Report▷ | ⊕ ⊖ | Compare Products | Compare Concepts Simsbury, Connecticut 06089
(800) 800-2738

Date Prepared: 05/20/2010

Summary of Illustrated Policies

Report Purpose
This report provides limited summary information for the individual policies listed below. A Basic Compliance Illustration, and not this summary report, must be relied on for an understanding of the specific policy provisions and illustrated policy values. Each Illustrated policy must be considered stand-alone and subject to its own provisions. Please refer to the Basic Compliance Illustration for each policy which accompanies this report.

| Policy Number | Primary Insured(s) | Sex/Age | Policy | First Year Planned Premium Outlay | Initial Death Benefit Option | Initial Death Benefit* |
|---|---|---|---|---|---|---|
| 1 | , | M/65 F/65 | Hartford Bicentennial UL Joint Freedom II | $27,158 | Level | $2,000,000 |
| 2 | , | M/65 | Hartford Bicentennial UL Freedom w/LAABR | $14,324 | Level | $500,000 |
| 3 | , | F/65 | Hartford Bicentennial UL Freedom w/LAABR | $11,500 | Level | $500,000 |
| | | | Total | $52,982 | | $3,000,000 |

SYSTEM AND METHOD FOR PROCESSING DATA RELATED TO LAST SURVIVOR LIFE INSURANCE POLICIES

FIELD OF INVENTION

The present invention relates to computer systems, and particularly to computer systems for use in the financial services field, and particularly for processing of data related to life insurance policies.

BACKGROUND

Individuals engaged in retirement financial planning may have a variety of goals. For example, a couple may seek to amass sufficient assets to provide for a desired standard of living for an expected lifetime, pass wealth to children and other beneficiaries, provide a reasonable standard of living even if one or both of them live longer than anticipated, and provide for additional expenses in the event of such contingencies as serious illness.

Last survivor life insurance policies may be employed to address a desire to pass wealth to children or other beneficiaries, such as grandchildren or other relatives. In these policies, a death benefit is only paid on the death of the last to die of all of the insureds. These policies may be embodied as permanent life insurance policies, such as whole life and universal life policies. These policies are sometimes purchased with a single premium payment, which may be taken from investments, for example, or through a series of premium payments.

However, last survivor life insurance policies do not provide solutions of the other goals noted above. For example, chronic illness typically results in increased expenses for in-home care or nursing or assisted living facilities, which expenses may not be included in a retirement plan's assumptions. Still further, a retirement plan may provide for sufficient income to live to age 90, but not include sufficient assets or guaranteed income to maintain the same standard of living if an individual lives past age 90.

Viatical settlements may be available for owners of permanent life insurance policies to obtain use of death benefit amounts during the lifetime of the insured. In an exemplary viatical settlement, a third party purchases the insurance policy from the owner in exchange for a cash payment. The cash payment represents a discounted portion of the death benefit, depending on the third party's assessment of the mortality of the insured. The third party assumes any obligations to make payments to the insurance company, and designates itself as the beneficiary to receive the death benefit upon the death of the insured. Viatical settlements are in many cases available only for those who are assessed by the third party as having a sufficiently short life expectancy to provide for a likely short term investment return.

There is accordingly a need for systems to facilitate planning and implementation for financial products and services that provide both for a death benefit on the last to die of a couple, as well as benefits triggered by risks that may arise during the lifetime of the couple. For insurance policies, the planning and implementation process typically involves generation of illustrations to be presented to prospective insureds, completion of applications by prospective insureds and submission of the applications to the insurance company, performing by the insurance company of underwriting on the prospective insured, issuance of policies by the insurance company to the insured, and administration of issued policies. A solution which provides for planning and implementation through one or more of these processes is desirable.

SUMMARY

In an embodiment, a computer system for processing data related to last survivor life insurance policies having a death benefit payable on a death of a last to die of two or more insureds, one or more associated single life policies on the lives of one or more of the insureds and having one or more ancillary benefits, includes a data storage device storing data indicative of rates and corresponding death benefit amounts for last survivor policies and individual life insurance policies based on age and gender of insureds, and rates and available benefit amounts associated with each of the ancillary benefits; a user accessible device in communication with the data storage device; and a processor in communication with the data storage device and the user accessible device, the processor configured to: cause the user accessible device to prompt for face value amounts or a premium amount to be paid, age and gender of the two or more insureds, and user selection of the one or more ancillary benefits; receive via the user accessible device data indicative of a user selection of a premium amount, age and gender of the two or more insureds, and the one or more ancillary benefits; determine, based on the received data, face value amounts or premium amounts for a last survivor life insurance policy and the one or more individual life policies having the selected one or more ancillary benefits; and generate and display on the user accessible device illustrations for each of the policies.

In an embodiment, a computer-implemented method for processing data related to last survivor life insurance policies having a death benefit payable on a death of a last to die of two or more insureds, one or more associated single life policies on the lives of one or more of the insureds and having one or more ancillary benefits, includes: causing, by a policy illustration generation system, a user accessible device in communication with the computer to prompt for face value amounts or a premium amount to be paid, age and gender of the two or more insureds, and one or more ancillary benefits, for a last survivor life insurance policy having a death benefit payable on a death of a last to die of two or more insureds, and one or more associated single life policies on the lives of one or more of the insureds; receiving at the policy illustration generation system via the user accessible device, responsive to the prompting, data indicative of a user selection of a premium amount or face value, age and gender of the first and second insured, and at least one selected ancillary benefit; determining by the policy illustration generation system, based on the received data and stored data indicative of insurance rates and rates for the at least one selected benefit, face value amounts or premium amounts for the policies, at least one of the policies including the at least one selected ancillary benefit; generating by the policy illustration generation system illustrations for each of the policies, and transmitting the illustrations to the user accessible device; receiving by a policy application processing system via the policy illustration generation system and the user accessible device data for applications for the policies, the policy application processing system employing common data relating to the first and second insureds in the applications; receiving, responsive to completed applications for the policies, by an underwriting administration system, data relating to the policies, and processing by the underwriting administration system data relating to the policies, the underwriting application system employing common data relating to the first and second insureds; and generating, by a policy document generation system, responsive to receipt of data indicating underwriting approval, policy contracts and riders for the policies, the policy contracts providing for issue of the policies on a same day.

In an embodiment, a non-transitory computer-readable medium has processor-executable instructions stored thereon, which instructions, when executed by the processor, cause the processor to: access data related to a last survivor life insurance policy having a death benefit payable on death of a last to die of at least two insureds and at least one associated single life policy having a death benefit payable on death of one of the at least two insureds, and one or more ancillary benefits; cause a user accessible device to prompt for face value amounts or a premium amount to be paid, age and gender of the two or more insureds, and user selection of the one or more ancillary benefits; receive, responsive to the prompts, data indicative of premium amount or face value, data relating to mortality of the two or more insureds, and a selection of one or more ancillary benefits; determine, based on the received data, face value amounts or premium amounts for a last survivor life insurance policy and the one or more individual life policies having the selected one or more ancillary benefits; and generate and transmit for display on the user accessible device illustrations for each of the policies.

In an embodiment, a computer system for processing data related to last survivor life insurance policies having a death benefit payable on a death of a last to die of two or more insureds, one or more associated single life policies on the lives of one or more of the insureds and having one or more ancillary benefits, has the following networked systems: a policy illustration generation system configured to, responsive to receipt of data indicative of a user selection of face value amounts or a premium amount to be paid, age and gender of the two or more insureds, and one or more ancillary benefits, for a last survivor life insurance policy having a death benefit payable on a death of a last to die of two or more insureds, and one or more associated single life policies on the lives of one or more of the insureds, determine corresponding premium amount or face value, and generate illustrations for each of the policies for transmission and display to a user; a policy application processing system configured to receive, via the policy illustration generation system, data for applications for the policies, and to employ common data relating to the two or more insureds in the applications; an underwriting administration system configured to administer underwriting for the policies, employing common data relating to the two or more insureds; and a policy document generation system configured to generate policy documents for the policies, the policy documents providing for issue of the policies on a same day.

BRIEF DESCRIPTION OF DRAWINGS

FIG. 5 is an exemplary screen shot of a screen, provided to facilitate user selection of face value amounts, on a client device in communication with a system for generation of illustrations in accordance with an embodiment.

FIG. 6 is an exemplary screen shot showing illustrations of last survivor and individual life policies generated by a system in accordance with an embodiment.

FIG. 7 is an exemplary screen shot showing one of the illustrations of FIG. 6 in greater detail.

FIG. 8 is an exemplary screen shot showing user-selectable policy options.

DETAILED DESCRIPTION

Figure 1:
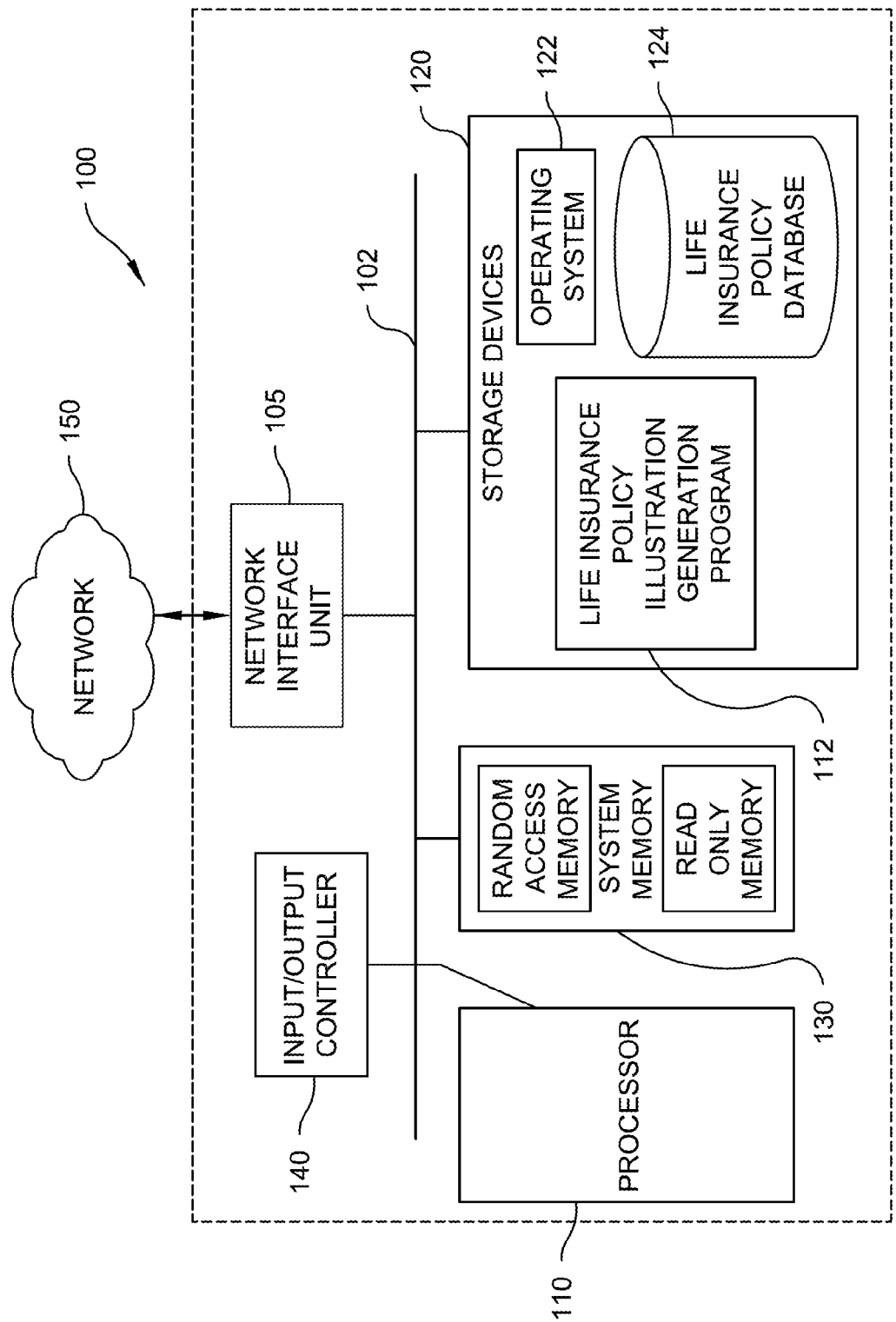
FIG. 1 is a schematic diagram of an exemplary computer system for implementation of a method and system of the invention.

It is to be understood that the figures and descriptions of the present invention have been simplified to illustrate elements that are relevant for a clear understanding of the present invention, while eliminating, for the purpose of clarity, many other elements found in typical computer systems and methods for processing of data relating to insurance. Those of ordinary skill in the art may recognize that other elements and/or steps are desirable and/or required in implementing the present invention. However, because such elements and steps are well known in the art, and because they do not facilitate a better understanding of the present invention, a discussion of such elements and steps is not provided herein.

Proposed insureds contemplating the use of last survivor life insurance policies for estate planning and income replacement purposes may desire to provide for protection against risks other than the death of the insureds when purchasing last survivor life insurance. The other risks may include, by way of example, a chronic illness, unexpected longevity, disability preventing one from earning anticipated income and other risks.

A challenge faced by financial planners, life insurance underwriters and individuals contemplating retirement is balancing a variety of needs of individuals and families. For example, individuals may seek financial plans and financial products and services that provide for needs such as: income during retirement, funds that can be passed on to children and grandchildren, and assuring that funds are available for unexpected contingencies such as a serious illness or unexpected longevity.

An exemplary structure to address this challenge for at least two individuals, such as a husband and wife, is a combination of a last survivor life insurance policy on the lives of the two insureds, and two individual life insurance policies, one on each of the lives of the insureds. The two individual life policies may include coverage for ancillary risks. Ancillary risks here are risks other than death of one or both of the insureds. Exemplary risks for which such ancillary coverage may be provided include chronic illness of one of the individuals, disability of one or both of the individuals and longevity of one or both of the individuals beyond the lifetime anticipated by a retirement plan.

The combination of three policies, with at lest one ancillary benefit associated with one or both of the individual life insurance policies, may be integrated or coordinated with respect to data processing related to generation of illustrations, submission of applications, underwriting of coverage, generation of policy documents, issuance and delivery of the policies, and premium billing and other post-issue administration of policies. With respect to generation of illustrations, a computer system may be configured to prompt a user for data needed to generate all three policies, employ received data, such as proposed insured age and gender, in illustrations for multiple policies and generate illustrations that summarize premiums for all three policies both separately and aggregated. With respect to submission of applications, a system may generate an application form that prompts a user to select the three policies and one or more ancillary benefits, and receives user selections of applied for coverage for all three policies. The system may associate data input with respect to one of the applications, such as data relating to the insureds provided in an application for the last survivor policy, in connection with any of the policies. With respect to underwriting, the data requested and received with respect to health of the insureds can be employed for all three policies. With respect to generation of policy documents, the policies may be issued on the same day, with consecutive policy numbers. Issue on the same day facilitates simplicity of administration, as certain events, such as premium payments, are based on policy anniversaries. Delivery of the policies may be facilitated with printing on paper and physical delivery in a single envelope, or by electronic or fax transmission to a single fax machine, e-mail address, or other address associated with a single device of the insureds. Administration, such as premium billing, may also be combined, such as by scheduling premium due dates to coincide for all of the policies, and by generation of combined bills for all premiums due on the three policies on a given due date.

The ancillary risks that may be addressed include serious illness, chronic illness and disability. The costs associated with serious illness or disability can be ameliorated with an individual life insurance policy with an accelerated benefit rider that provides for periodic payments of amounts to a policy owner. Such a policy, rider, and associated systems and methods are disclosed, for example, in U.S. Patent Publication No. 2008/147447, entitled "Accelerated Benefit Insurance Product Management and Distribution System and Method," assigned to the assignee herein, which is incorporated by reference herein in its entirety.

In a last survivor policy, periodic payments, conditioned on a medical condition of an insured, which reduce the death benefit, are only available if both of the insureds meet the condition of having a medical condition, or if a last surviving insured meets the medical condition. A last survivor policy thus does not provide periodic payments responsive to a medical condition of one of the insureds, if the other insured is in good health or otherwise does not meet the conditions for accelerated death benefit payments. However, the individual life insurance policies may each include a rider providing for periodic payments that reduce the death benefit based on a medical condition of the insured. The ancillary risk associated with a medical condition of either of the insureds, while the other insured is living, is thus addressed.

The risk associated with a medical condition of an insured may also be addressed by a rider may be provided on the last survivor insurance policy providing for periodic payments based on a medical condition and reducing the death benefit on the last survivor policy.

Payments of a benefit conditioned on a medical condition of an insured may reduce the death benefit of the policy. The benefits available may be equal to an annual or monthly percentage of the entire death benefit, or a portion of the death benefit. The amount available may be determined such that the entire amount available will be paid down in a period of, for example, one to five years. Certification of disability may be required, and may be required to be renewed on a periodic basis.

The ancillary risk that one or both insureds will live longer than provided for by a financial or retirement plan may be addressed by riders on the individual life policies providing that, on condition that the insured has reached a certain minimum age, and other conditions, the owner may receive periodic payments that reduce the death benefit under the policy. The other conditions may include, for a universal life policy, a certain shadow account balance. For a whole life policy, the other conditions may include that the policy be fully paid up.

An ancillary risk is the risk of disability of one of the insureds. This ancillary risk may be addressed by a rider on one or both of the individual policies that provides for payments conditioned on disability of the insured. The definition of disability may vary. For example, the definition of disability may be based on an inability to perform a certain number of activities of daily living without substantial assistance. Such a definition of disability may be appropriate for a retired individual. Definitions of disability related to ability to perform activities of an occupation may be appropriate for a policy issued to an individual who has not yet retired. The payments under the disability rider may reduce the death benefit, or may be in addition to the death benefit, depending on the type of coverage.

Various combinations of ancillary benefits may be desired. For example, for a couple where one of the couple is retired or nearing retirement, while the other of the couple has a significant time until retirement, only the individual life policy on the individual having a significant time until retirement will have the disability benefit based on inability to perform an occupation.

In another example, one member of a couple may have a family background in which no one has lived past the age of 80. The other member of a couple may have a family background in which living past the age of 90 is not unusual. This couple may desire a longevity rider only on the individual life policy on the member of the couple having a family background in which living past the age of 90 is not unusual.

A challenge is presented in generating illustrations for a combination of a last survivor life insurance policy on the lives of two or more insureds and one or more associated individual life policies on the lives of the insureds having ancillary benefits. For example, the prospective insureds may desire a certain level of coverage for the death benefits and ancillary benefits, which require an illustration system to determine the premiums required to meet the requested level of coverage. The prospective insureds may desire a certain premium amount and timing of premiums for the three policies as an aggregate, requiring an illustration system to determine the amount of coverage for three policies. In an embodiment, a computer system prompts a user at a user interface for information pertinent to the combination of a last survivor universal life insurance policy on at least two insureds, and one or more riders on the policies. The provided information may include a single premium amount to be applied to all of the policies. The insured, for example, may plan to pay the premium from a withdrawal from another investment, as a rollover of a retirement savings plan, as a transfer of cash value from a whole life insurance policy, or in another manner. The insured may provide a proposed series of premium payments, such as a series of level payments over a term from 5 to 20 years.

The system may then calculate the face value amount of all three policies, using, for example, a formula in which the face value of the two individual life policies have a specified relation to one another and the face value of the last survivor life insurance policy. For example, the system may have a default in which the face value of the two individual life insurance policies are equal, and 25% of the face value of the last survivor policy. Other percentages may be employed. The system may prompt the user to select other percentages or relationships. Alternatively, the system may provide a default face value amount, such as $500,000, for each of the individual life policies.

An available rider may be a withdrawal benefit, upon the insured, or all of the living insureds in a last survivor policy, reaching a certain age, such as 85, 90 or 95, or another age between 85 and 95, which benefit provides that the owner may receive periodic payments from the insurance company. Each payment reduces the amount of the death benefit. In an embodiment, payments may reduce the amount of the death benefit until a residual or minimum death benefit value is reached. The minimum may be established or calculated as a percentage of the policy face value, for example, and may be determined in accordance with applicable regulatory definitions of life insurance.

Each payment may be a proportionate amount of the death benefit when the payments start. For example, each payment may be a value such as 0.5 percent, 1%, 1.5%, 2.0%, or 2.5% on a monthly basis, 5%, 10% or 15% on an annual basis, 1/12 of 5%, 10% or 15%, on a monthly basis, or another value within the ranges of those values. The monthly and annual payment periods are merely exemplary, and payments may be on another basis, such as weekly, once every two weeks, twice each month, once each calendar quarter, or another period.

The rider may provide that the owner may have the option of receiving the benefits or declining the benefit payments and maintaining the death benefit unchanged.

In an embodiment, after a final withdrawal payment is made, the policy may continue in effect, and a death benefit amount may be established in accordance with stored instructions. By way of example, the death benefit amount may be a percentage of the face value or of the death benefit amount prior to a first of the payments. The amount of the percentage may be based on a percentage sufficient to maintain a status of the policy as a life insurance policy under applicable regulations.

The withdrawal benefit may be available on condition that the policy is fully paid up. For a universal life policy, the withdrawal benefit may be available on condition that a shadow account associated with the policy have a positive balance or a non-negative balance, or at least a fixed non-zero positive balance. A shadow account may also be termed a policy protection account. The minimum fixed non-zero positive balance may be at least as great as an annual premium under the policy. A shadow account balance may be calculated by a sum of all premiums paid less a sum of all charges from the account, such as rider fees, commission charges and charges for insurance. The condition that the policy be fully paid up, or that a shadow account have at least a fixed balance, provides a greater likelihood that the policy will not lapse before the death of the insured, and thus that the insurance company will need to pay the death benefit. On the other hand, if premium payments are required to maintain the policy in force, then there is a possibility that the policy will lapse before the death benefit is paid.

In an embodiment, a target value of a shadow account may be set at the time the illustration is generated. The target value is the minimum value of the shadow account at the time that the owner becomes eligible for the benefit. The target value may be stored in a system memory. The target value may be equal to a fraction of the death benefit, a factor multiplied by an annual cost of insurance, and may be increased by a factor based on each rider applicable to the policy. The target value may be recalculated as a result of certain changes to the policy requested to be illustrated. These changes may include: a change in the face amount of the policy, a change in the insurance class of the insured, other riders added to the policy or removed from the policy, and increases or decreases to benefits provided by riders attached to the policy. In the event of such a change, the system may calculate a new target value, which will require recalculating the face value or premiums corresponding to the requested face value or premium amount.

The shadow account, which is also called the policy protection account, has a value which may be determined as follows. A policy protection account may have one section or multiple sections. In an embodiment, a policy protection account may include Section A and Section B. The balance of a policy protection account, or of a section of a policy protection account, may be based on premiums paid on the policy, interest credited on a balance of the policy protection account, administrative charges, a cost of insurance rate based on the initial or later policy face amount, and charges based on riders. The system, in generating an illustration, may calculate balances of a policy protection account using such a formula and assumptions as to timing of premium payments, policy loans, and other conditions.

An algorithm for determination of a policy protection account value may be, by way of example: (Prior shadow account value)+((Premiums paid subsequent to date of prior shadow account value)×(1−(Percentage deducted from premiums))+((Prior shadow account face value)×(credited interest rate))−((Face Value)×(percentage charge for period))−(Amount of withdrawals from policy)−(Amount of loans from policy)+(Amount of loan repayments). The period may be a year, or another time period, such as a calendar quarter or month.

Referring to FIG. 1, an exemplary computer system 100 for use in an implementation of the invention will now be described. In computer system 100, processor 110 executes instructions contained in programs such as life insurance policy illustration application program 112, stored in storage devices 120. Storage devices 120 may include suitable media, such as optical or magnetic disks, fixed disks with magnetic storage (hard drives), tapes accessed by tape drives, and other storage media. Processor 110 communicates, such as through bus 102 and/or other data channels, with network interface unit 105, system memory 130, storage devices 120 and input/output controller 125. Via input/output controller 125, processor 110 may receive data from user inputs such as pointing devices, touch screens, audio inputs and keyboards, and may provide data to outputs, such as data to video drivers for formatting on displays, and data to audio devices. Storage devices 120 are configured to exchange data with processor 110, and may store programs containing processor-executable instructions, and values of variables for use by such programs. Processor 110 is configured to access data from storage devices 120, which may include connecting to storage devices 120 and obtain data or read data from the storage devices, or place data into the storage devices. Storage devices 120 may include local and network accessible mass storage devices. Storage devices 120 may include media for storing operating system 122 and mass storage devices such as insurance data storage 124 for storing data related to policies and insureds Such data may include data regarding policies, insureds, owners, cash balances, shadow accounts and other relevant data. In an embodiment, inputs may include user interfaces, including workstations having keyboards, touch screens, pointing devices such as mice, or other user input devices, connected via networked communications to processor 110. Network interface unit 105 may communicate via network 150 with other insurance company computer systems, computer systems of brokers, financial advisors, insureds and owners, computer systems of banks and other financial institutions that effect payments of premiums under the policy and payments of benefits under the policies, remote sources of data, and with systems for implementing instructions output by processor 110. Network 150 may be or include wired or wireless local area networks and wide area networks, and over communications between networks, including over the Internet. Any suitable data and communication protocols may be employed.

Figure 2:
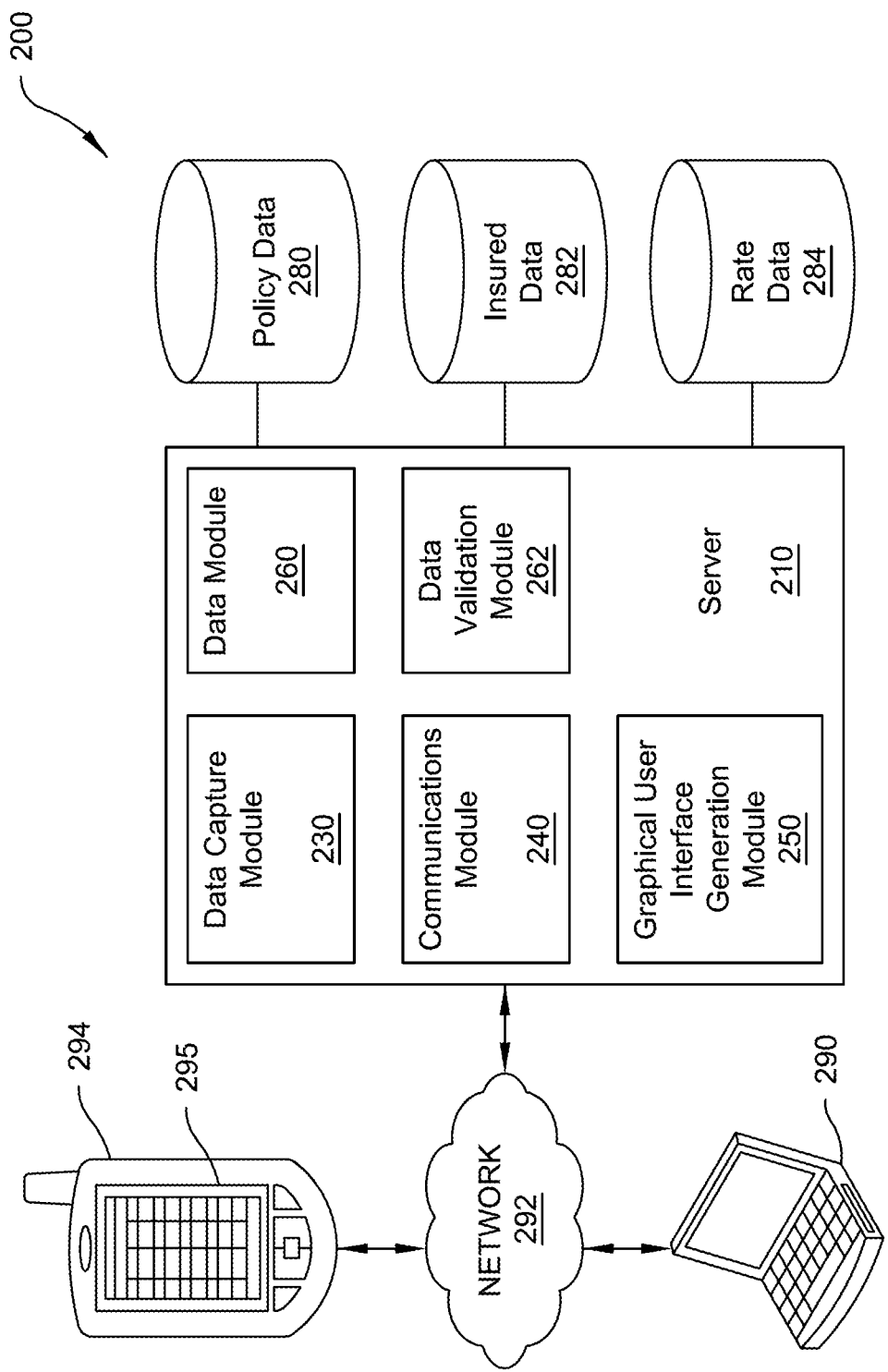
FIG. 2 is a schematic diagram of an exemplary computer hardware server with networked devices for implementation of a method and system of the invention.

Referring now to FIG. 2, another exemplary embodiment of a system 200 of the present invention is shown. System 200 includes an insurance company server 210 which includes one or more engines or modules which may be utilized to perform one or more steps or functions of the present invention. In an embodiment, the present invention is implemented as one or more modules of a computer software program in combination with one or more components of hardware. Such software programs will be used generally where a policy owner, insured, broker or financial advisor or other representative of an insured or owner has sent a request for data or information to a server and comprises part of the processing done on the server side of the network. The program may be used in an Internet environment, where the server is a Web server and the request is formatted using HTTP (or HTTPS). Alternatively, the server may be in a corporate intranet, and extranet, or any other type of network. Use of the term "Internet" herein, when discussing processing associated with the user's request, includes these other network environments, unless otherwise stated. Additionally, a graphical user interface or insurance processing module may be implemented as an intelligent hardware component incorporating circuitry comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like. One or more functions of a web client or other module may be implemented as application software in the form of a set of processor-executable instructions stored in a memory of a client device, such as smart phone 294, and capable of being accessed and executed by a processor of the client device.

Referring still to FIG. 2, server 210 includes a data capture or input/output module 230, a communications module 240, a dynamic display generation or graphical user interface module 250, a data module 260, and a data validation module 262. Data module 260 is in further communication with a number of databases such as insurance policy database 280, insured database 282 and investment database 284. Databases in communication with server 210 may include both internal and/or external/third party databases. By way of example, external databases may include databases of financial services entities containing information relating to funds available for payment of premiums, data relating to insureds for use in generating illustrations or in determining whether insureds are eligible for issue of a policy prior to comprehensive underwriting. Server 210 may be configured for bulk upload of data for use in generating illustrations for and administration of insurance policies, such as data relating to proposed insureds, updates in costs of insurance and other rates, from a third party database or file or from another database or file of the insurance company. One or more modules may be configured to perform data validation steps prior to storing bulk uploaded data. Server 210 may further be configured to permit bulk download of data, such as policy and benefit data, to a client device.

In operation, server 210 is in communication with client devices, such as computer 290 or smart phone 294 via a network which facilitates interaction with server 210 through one or more graphical user interfaces as shown and described herein. As used herein, devices, such as client devices 290, 294 may exchange information via any communication network, such as a Local Area Network (LAN), a Metropolitan Area Network (MAN), a Wide Area Network (WAN), a proprietary network, a Public Switched Telephone Network (PSTN), a Wireless Application Protocol (WAP) network, a Bluetooth network, a wireless LAN network, and/or an Internet Protocol (IP) network such as the Internet, an intranet, or an extranet. Note that any devices described herein may communicate via one or more such communication networks.

Referring still to FIG. 2, utilizing client devices 290, 294, a properly authenticated system user, such as a prospective policy owner or a financial advisor of a prospective policy owner, may request preparation of an illustration or illustrations for a last survivor policy on two or more insureds, issued simultaneously with individual life policies on the insureds, together with one or more riders on the various policies to address ancillary risks, such as risks of chronic illness, disability preventing the insured from occupational duties, or other risks. A properly authenticated system user may provide data for an application for insurance, instructions for payment of premiums to accompany an application for insurance, and other transactions using a user interface 295 on smart phone 294, for example. Data indicative of a request for an illustration may result in the server accessing data and performing calculations for an illustration, and formatting and sending instructions to a printer for printing of a paper copy of an illustration, or for generation of an electronic image of an illustration for transmission via e-mail to a user or for upload on a web page or other accessible resource available to a user. The server may also confirm receipt of data indicative of a completed application for insurance and premium, and provide instructions for issue of a binding premium receipt to the user. A properly authenticated individual may access further data. In the present invention, one or more of the above modules, such as graphical user interface module 250, data module 260 and data validation module 262 may also be implemented in combinations of software and hardware for execution by various types of computer processors coupled to such hardware.

As used herein, a module of executable code may, for instance, comprise one or more physical or logical blocks of computer instructions which may, for instance, be organized as an object, procedure, process or function. Nevertheless, the executables of an identified module need not be physically located together, but may comprise separate instructions stored in different locations which, when joined logically together, comprise the module and achieve the stated purpose for the module such as implementing the business rules logic prescribed by the present system. In embodiments of the present invention a module of executable code may be a compilation of many instructions, and may be distributed over two or more different code partitions or segments, among different programs, and across two or more devices. Similarly, data, including by way of example policy data, insured data and investment data may be identified and illustrated herein within modules, and may be embodied in any suitable form and organized within any suitable type of data structure. Such data may be collected as a single data set, or may be distributed over different locations including over different storage devices, and may exist, at least partially, merely as electronic signals on a system and/or network as shown and described herein.

Figure 3:
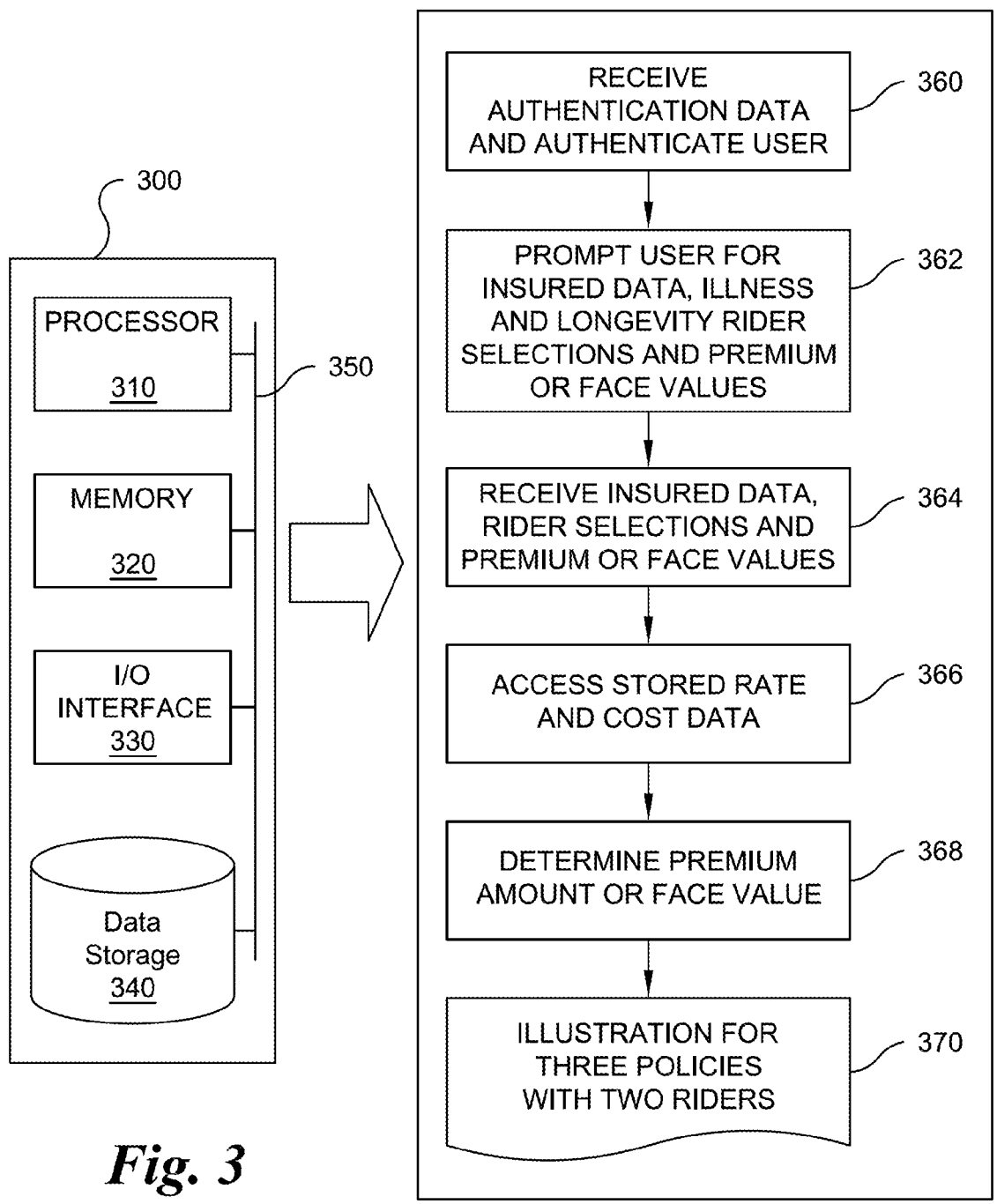
FIG. 3 is a schematic diagram of an exemplary computer server and process flow diagram for implementation of a method and system of the invention.

Referring to FIG. 3, in an embodiment, a computer server or client computer 300 running a client application such as a Web browser or a thick client application renders a graphical user interface, such as a series of input screens for viewing and input from a customer or consumer. Server or client computer 300 may include a processor 310, e.g. CPU, memory 320, I/O interface 330 and a storage mechanism 340 coupled together via a system bus 350 over which the various elements may interchange data and information. Computer 300 implements steps 360-370 in accordance with embodiments of the present invention.

Still referring to FIG. 3, computer 300 receives 360 authentication information from an authorized user, such as an insurance agent, financial advisor, or prospective insured, and authenticates the user. The system prompts the user 362 to input parameters for the desired life insurance policies with riders, such as a total premium amount, level premium amount and term, desired face value of a last survivor policy, and other data. The system also prompts the user for selections of riders and insured data. In an embodiment, the insured data may be accessed by the system from data storage 340. By way of example, the insureds may already be customers of an insurance company operating the system. The system receives 364 the requested policy data, including selections of riders for ancillary risks, such as a requested withdrawal rider based on longevity for one or both of the individual life policies, a disability rider for one or both of the individual life policies, a requested periodic payment rider based on a medical condition of the insured, and the insured data. The system accesses 366 stored data for insurance rates, cost of insurance, and the like. The accessed data may include data for calculating target shadow account balances as of a benefit eligibility date, shadow account or policy protection account balances for combinations of face value and premium, which process may continue iteratively until a combination of premium and face value is obtained that provides for the policies remaining in force for the lifetimes of the insureds. The system determines 368, the premium or face value amounts for the three policies in accordance with the user-supplied information and the calculations. The system then generates illustrations 370 for the three policies. The illustrations state the premium amounts, face value amounts, riders, and assumptions, such as that no policy loans will be taken and that all premiums will be paid no later than the due date. The illustrations may be formatted as documents for display and are furnished to a user-accessible device for display to the user.

Figure 4:
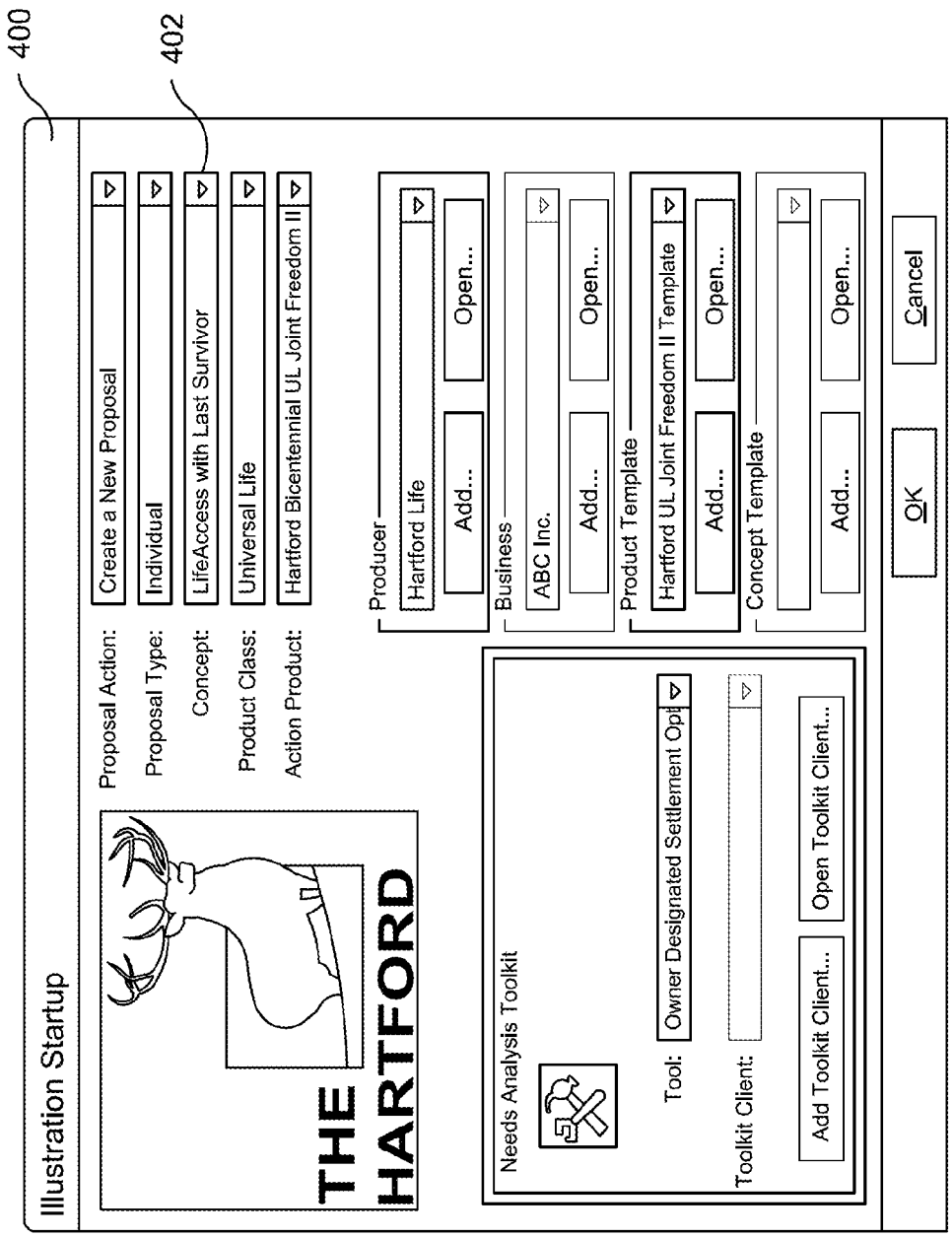
FIG. 4 is an exemplary screen shot of a screen on a client device in communication with a system for generation of illustrations in accordance with an embodiment.

Referring now to FIG. 4, a screen 400 generated by a computer system for generation of illustrations is shown. The user may select various product options, including a combination of policies and riders. Here, at 402, a drop down menu is provided with options of riders and policies. The displayed option is "Last Survivor with Life Access", which refers to a combination of a last survivor life policy on the lives of two insureds, with individual policies on each of the insureds, and a rider on each of the individual life policies providing for periodic payments that reduce the death benefit based on a medical condition of the insured. Other options may include the same combination of policies with an age based withdrawal benefit on the last survivor policy or on the individual policies, the same combination of policies to be issued prior to comprehensive underwriting, or the. Additional selections may include a class of product, a particular policy form, and other data.

Referring now to FIG. 5, responsive to the user selection of options from screen 400, the system generates screen 500. The screen provides options under various tabs. The "Life-Access" tab illustrates prompts for options for the individual life policies. The user may select a face amount 502 for a first one of the individual life policies, and select a face amount 504 for a second one of the individual life policies. The user is presented with options to confirm that the rider providing periodic payments that reduce the death benefit based on a medical condition of the insured is provided on both of the individual life policies. In the example shown, the user has selected the same face amount, $500,000, for both individual policies. The user has selected a longevity rider for second insured's policy, as shown by the check box 510, while no longevity rider has been selected for the first insured's policy, as shown at check box 512. The user may select the "Insured" tab 506 to be prompted for and to input insured data, such as names, ages, genders and family relationships of the insureds.

Figure 6:
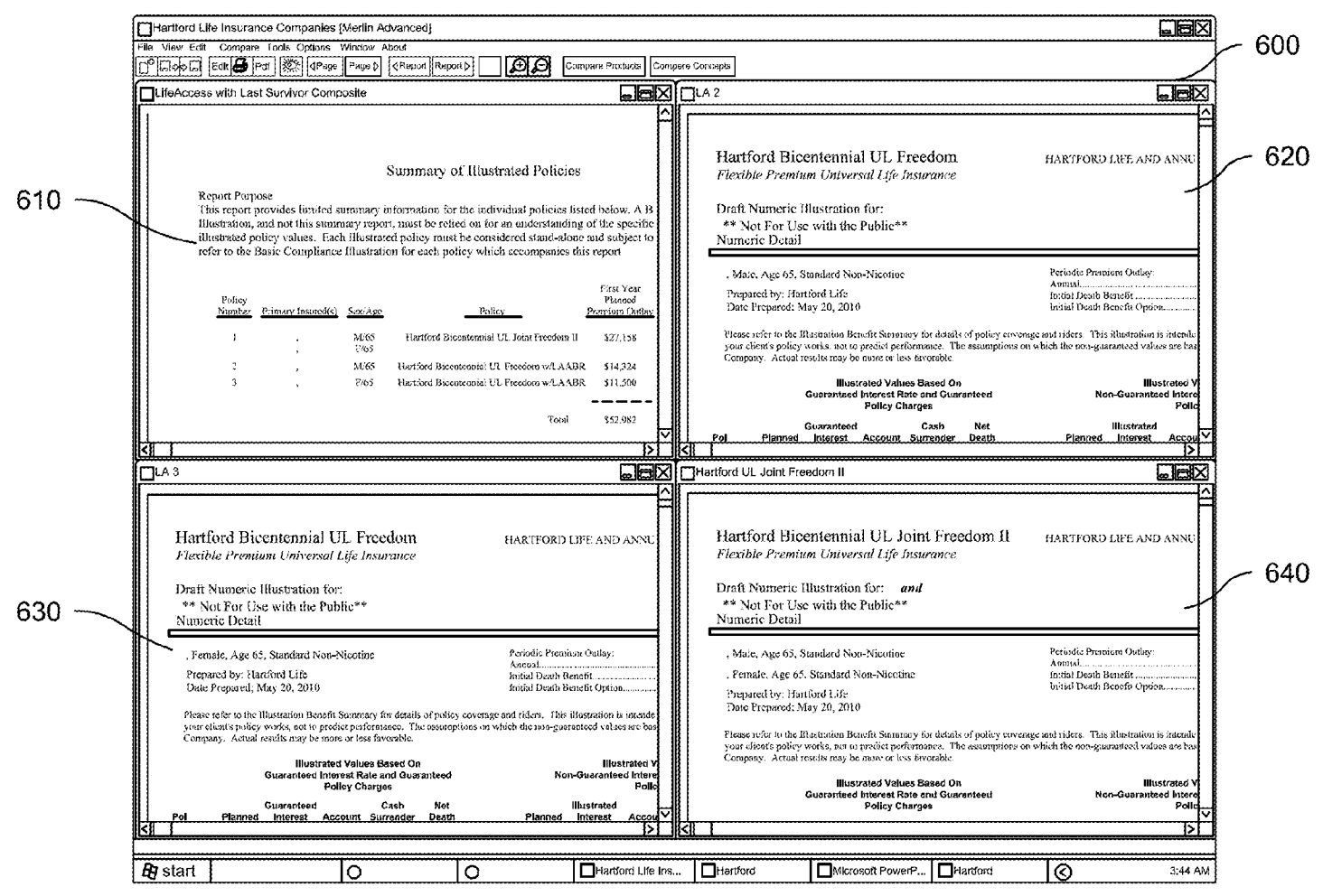

Referring now to FIG. 6, the system has generated illustrations, responsive to user input of the selected policy and insured data. Screen 600 presents summaries of the three policies in window 610, an illustration of the last survivor policy in window 620, and illustrations of the two individual policies in windows 630, 640. In this example, the two insureds are a male and female, both age 65. Desired face values of the three policies have been input, and the premiums in the illustrations have been calculated by the system. The premiums reflect rates for nonsmokers with a rating classification of standard. Illustrations may be provided for other ratings. For example, a rating of preferred would be appropriate for an insured in extremely good health. Data accessible to the system would reflect lower rates, as compared to the rates for the standard rating classification, for an insured of the same gender and age, which rate data would be employed by the system in calculating the premium or the face value amount.

Referring now to FIG. 7, the summary of policies of window 610 of FIG. 6 is shown in greater detail. The summary shows, under initial death benefit value column 710, that the user selected face amounts of $2,000,000 for the last survivor policy, and $500,000 for each of the individual life policies. The first year planned premium outlay for each is shown. The first year premium may be based on a multi-year level premium, such as level premiums for 10 years.

Figure 8:
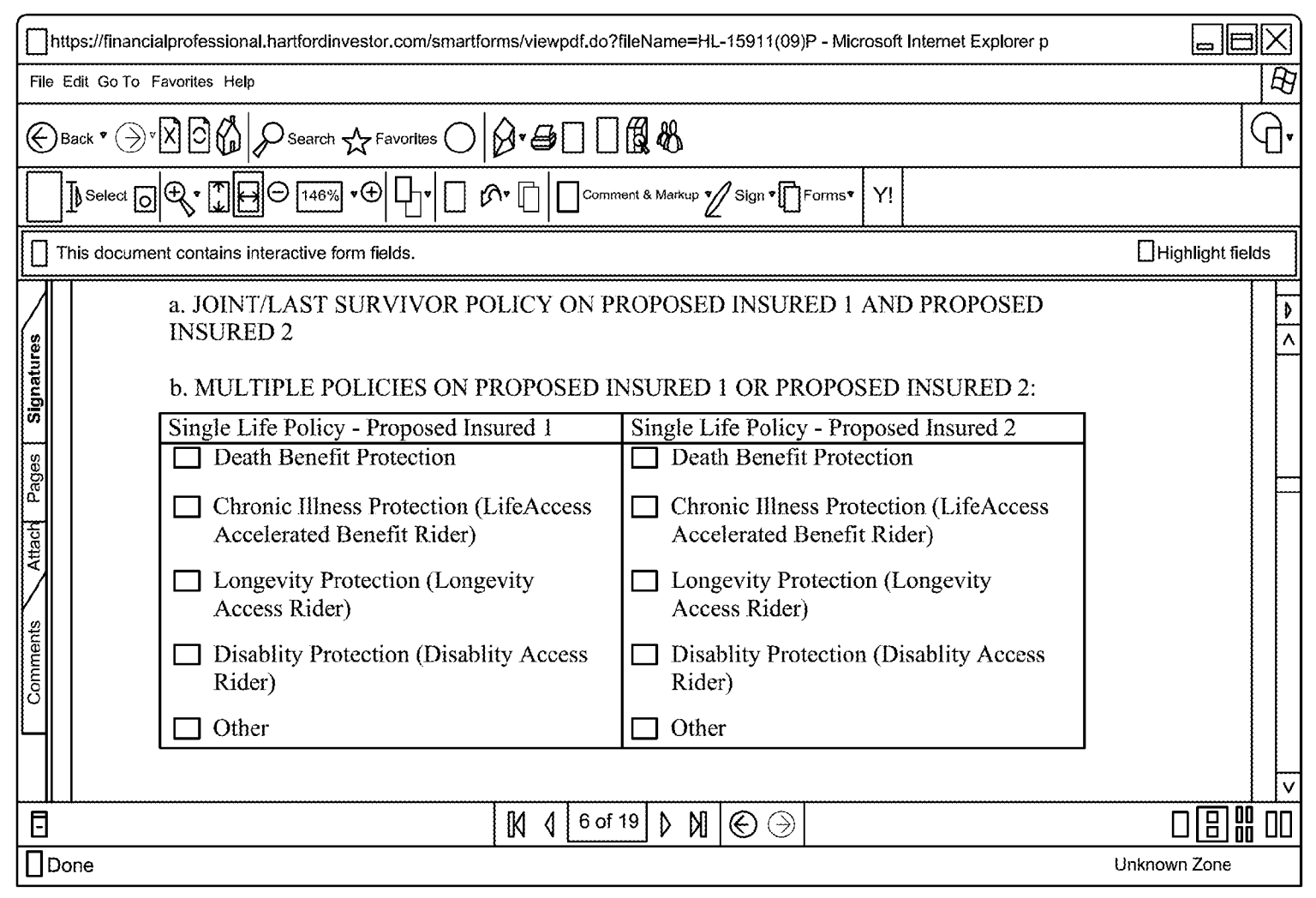

Referring now to FIG. 8, a portion of a form 800 is shown with options for selecting ancillary benefits on the individual life policies. The system generates the form 800 for display, prompting the user to select for each of two individual life policies, a death benefit, a chronic illness accelerated death benefit, a longevity accelerated withdrawal benefit, a disability access benefit. The user is also prompted to select "other", which may cause the system to generate a second screen with additional choices. The system may be configured to make available a selection of an accelerated benefit rider only following user selection of a death benefit for that policy.

Figure 9:
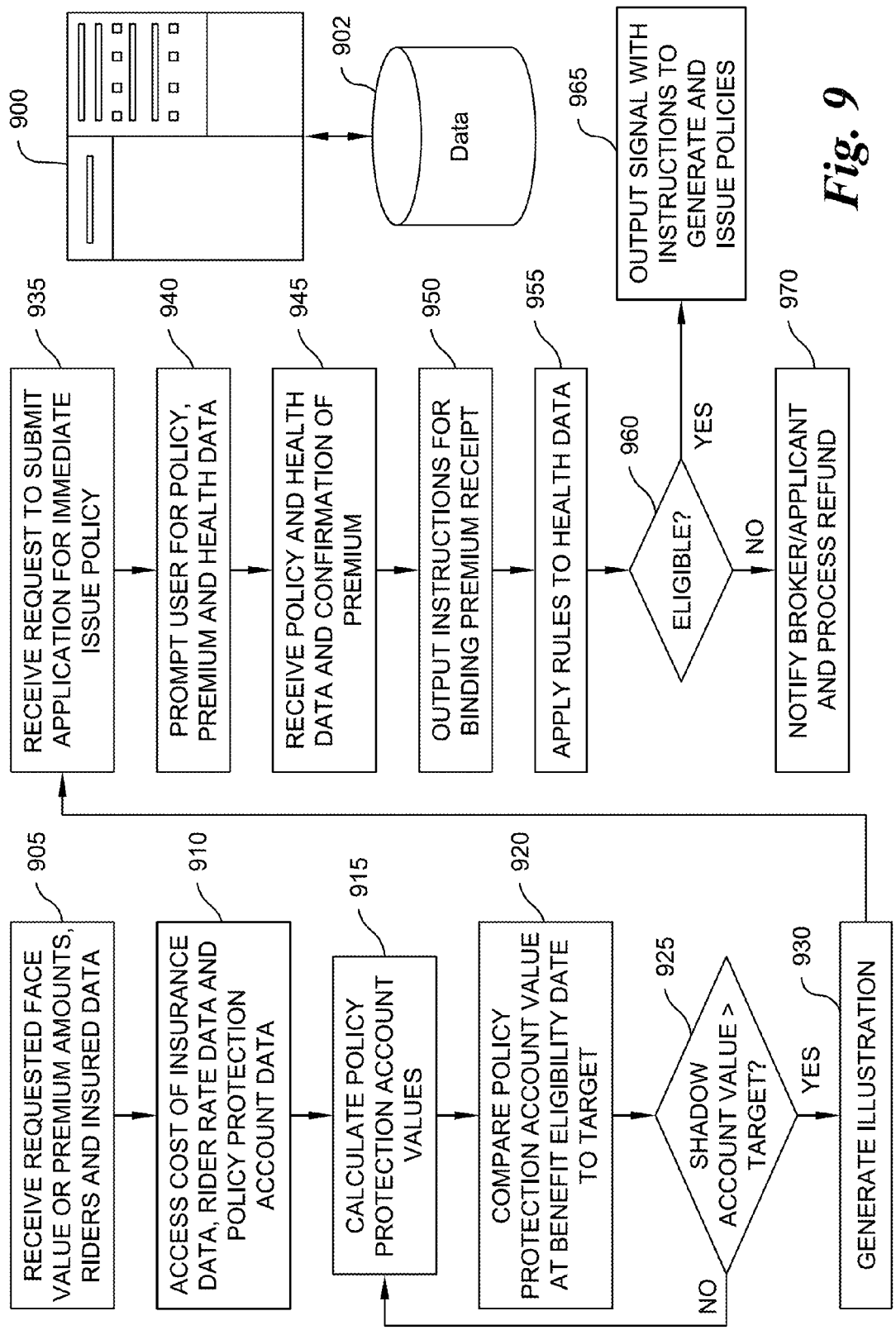
FIG. 9 is a process flow diagram of an exemplary process for generating illustrations of policies and processing insurance policies in accordance with an embodiment.

Referring now to FIG. 9, a process flow of a method of generating illustrations and receiving applications for policies issued prior to comprehensive underwriting is shown. The process flow may be performed by insurance company server computer system 900, which is in communication with data storage device or system 902. Server computer system 900 may be in communication, via one or more local networks or the Internet, with user-accessible devices. Server computer system 900 is merely exemplary, and the steps in the method of FIG. 9 may be performed by other computer systems and networks of two or more interconnected computer systems. The system receives 905 requested face value or premium data, insured data, requested riders, including for example accelerated death benefits in the form of periodic payments based on certification of a medical condition of the insured for individual life policies, and withdrawal benefits based on age, for a combination of a last survivor policy and at least two individual life insurance policies. The system accesses 910 applicable data, such as cost data, rider rate data, and formulas for calculating policy protection account balances. The system then calculates 915 policy protection account balances.

The system may project values of policy protection accounts for each of the policies. The system may determine projected policy protection account balances based on a schedule of projected premium payments, charges based on policy face value, interest credited on balances and charges based on riders. For example, a formula may be employed in which each premium is added to the policy protection account, less an administrative charge and a percentage premium charge for payment. A cost of insurance charge may be calculated based on the death benefit amount and the annual rate per unit of protection, and deducted from the policy protection account balance. A charge for each rider may be deducted as a percentage of each premium, a percentage of the death benefit amount on an annual basis, or another basis.

For any policy having a withdrawal benefit based on longevity, there may be a required target policy protection account balance as of the benefit eligibility date. The target policy protection account balance required is a minimum for eligibility for the withdrawal benefit, and may be a fraction of the face value of the policy, or may be a set numerical value. The system may compare 920 a projected policy protection account balance, determined using a proposed schedule of premium payments, whether premium payments in accordance with the schedule will cause the policy protection account balance to reach the target balance by the benefit eligibility date. Responsive to determining that the policy protection account balance will not reach 925 the target balance by the benefit eligibility date, the system will recalculate the projected policy protection account balances employing a different premium schedule or a different policy face amount. For example, the system may increment each payment in the premium schedule by a set value, such as $100 or $1000, or may increment each payment by a percentage, such as 1% or 1.5%. Alternatively, the system may decrease the face value of the last survivor policy by a numerical value, such as $1000, or by a percentage, such as 1% or 1.5%, and then recalculate the policy protection account balances and compare the policy protection account balance as of the benefit eligibility date to the target minimum. If the calculated shadow account balance is in excessive of a threshold amount over the target, such as a percentage, such as 1% of the target, or a dollar value, such as $1000, then the system may recalculate using a decremented premium amount.

If the policy protection account value projected as of the benefit eligibility date is above the target, then the system proceeds to generate illustrations 930 for the requested policies. The system may, at the time of generating the illustrations, or thereafter, receive 935 a request from the user to submit an application or applications for life insurance issued prior to comprehensive underwriting for the illustrated policies.

In response, the system may prompt 940 the user to provide data for an application for life insurance for issue prior to comprehensive underwriting. A method and system for applications for life insurance for issue prior to comprehensive underwriting is disclosed, for example, in U.S. Patent Publication No. US 2011/0125651, entitled "System and Method for Administering Life Insurance Policies Issued Prior to Underwriting," U.S. Patent Publication No. US 2011/0125536, entitled "System and Method for Administering Insurance Policies Issued Before Comprehensive Underwriting," and U.S. Patent Publication No. 2011/0125537, entitled "System and Method for Application Processing and Policy Administration for Insurance Policies Issued Before Comprehensive Underwriting," all of which are assigned of record to the assignee of the present application, and are incorporated by reference herein in their entireties.

The system may generate prompts for responses to questions relating to health conditions of the insureds known to the insureds. The questions may include 10 or fewer questions, and may be questions relating to whether the insureds have been diagnosed as having, been treated for, or evaluated for, certain medical conditions or categories of medical conditions. The questions may appear as prompts on a user-accessible device. The system may also prompt for information required to complete the applications, including beneficiary data, such as name, address and relationship to insureds of the beneficiary or beneficiaries, including contingent beneficiaries, and for instructions for payment of an initial premium. The system receives data indicative of an application for the policies, the data including data indicative of responses furnished by the first and second insureds relating to health conditions of the first and second insureds known to the first and second insureds, and requested policy data, including data indicative of identification of beneficiary, and initial premium paid. The system may store in a memory storage device the received health condition data and requested policy data. The system may access from the memory storage device stored data indicative of criteria for eligibility for issue of a life insurance policy prior to comprehensive underwriting. These criteria may include that the answers indicate that neither of the insureds have not been treated, diagnosed or evaluated for any of the conditions. The system may determine based on the received data relating to the health conditions of the first and second insureds and the accessed data indicative of criteria for eligibility, whether the first and second insureds are eligible for life insurance issued prior to comprehensive underwriting. Responsive to a determination that the first and second insureds are eligible, the system may generate an output signal having data indicative of instructions to issue the requested life insurance policies on the lives of the first and second insureds, and an output signal having data indicative of instructions to commence comprehensive underwriting of the first and second insureds.

The application for life insurance will include other necessary information, such as the amount of the requested death benefit or face value, the type of insurance policy, e.g., universal life, whole life, identity of at least one beneficiary, and basic information regarding the proposed insureds, such as dates of birth, address and genders. The policy and insured data may be previously stored data employed in generation of the illustrations for the last survivor and individual life policies. In embodiments where a maximum death benefit is limited prior to completion of comprehensive underwriting, the application may include a first requested death benefit for the policy at issue and a second, higher requested death benefit for the policy or policies after completion of comprehensive underwriting.

In an embodiment, a broker may transmit the completed applications for the last survivor and individual life insurance policies, including responses to questions indicative of knowledge of facts which would render either of the proposed insureds not eligible for insurance issued prior to completion of comprehensive underwriting, and a premium. Upon receipt of the application and premium, an output signal with instructions to generate a binding premium receipt for each policy is provided 950. The computer system may provide an output signal having data indicative of the binding premium receipt to a computer system that is provided for generation of insurance documents. The binding premium receipt may be printed and delivered to the insureds. The binding premium receipt signifies that insurance coverage is provided to the insureds pending issue of a policy or a decision by the insurer to decline coverage and return of the premium. The coverage pursuant to the binding premium receipt is in effect from receipt of the binding premium receipt by the insured until receipt by the insured of the policy or a returned premium. The binding premium receipt serves as a temporary insurance agreement.

The computer system applies 955 predetermined rules to the responses to questions for eliciting knowledge of facts which would render either of the proposed insureds not eligible for issue of a policy prior to comprehensive underwriting. The computer system may have stored criteria for determining, based on the responses to the questions, whether the proposed insureds are eligible for issue of a life insurance policy prior to completion of comprehensive underwriting. For example, if there are 10 questions, particular answers to all 10 questions, to at least 9 of the questions, and so forth, may be required in accordance with the criteria for both of the proposed insureds to be eligible. A processor of the computer system may access the criteria from a memory storage device. The computer system may determine 960 whether each of the proposed insureds are eligible. The determination of eligibility may be based exclusively or partly on self-reported information relating to the health of the proposed insureds provided by the proposed insureds. The computer system may receive data indicative of information furnished by the proposed insureds relating to the health of the proposed insureds. In an embodiment, the data indicative of information furnished by the proposed insured relating to the health of the proposed insured may be exclusively, or may include, binary affirmative or negative responses of the proposed insured to questions relating to the health of the proposed insured. If either of the proposed insureds are determined to be not eligible for issue of a policy prior to comprehensive underwriting, then the system generates an output signal 970 having data indicative of instructions to notify the broker that coverage has been declined and an output signal with instructions to return the premium payment. By way of example, a check writing system may be provided with instructions to generate and mail a paper check to the prospective insured, or to the prospective insured in the care of the prospective insured's broker. The broker may receive the indication that coverage is declined and the returned premium. Upon receipt of the returned premium, coverage under the binding premium receipt terminates. In an alternative embodiment, the process flow may proceed to commencement of comprehensive underwriting, but without issue of a policy prior to completion of comprehensive underwriting.

If the proposed insureds are determined to be eligible, the system may generate an output signal 965 having data indicative of instructions to generate the applied for policies. The output signal with instructions to generate policies may be furnished to a separate computer system responsible for generation of life insurance policies and documents associated with life insurance policies. The output signal may include data indicative of variables needed for generation of the life insurance policies. The data may include data included in the application, such as identification of a particular types of policies, name and address of the insureds, name and address of one or more beneficiaries for each of the policies, death benefit amounts, identification of one or more riders, and other data customarily employed by a policy generation system. In an embodiment, the policies may be generated having a premium amount based on a rating furnished with the application for life insurance. The policies may include terms and conditions that are specific to policies issued prior to the completion of comprehensive underwriting. For example, such terms and conditions may include terms to the effect that the proposed insureds must cooperate with the comprehensive underwriting process, such as by meeting with a medical technician to have blood drawn, provide consents for treating physicians to provide information to the insurance company, and the like. Such terms and conditions may further include terms to the effect that the insurance company may change the rating or rating category of the proposed insureds based on the results of the comprehensive underwriting process, and may change the premiums based on the rating category change. Such terms and conditions may further include terms to the effect that a rating determined based on the results of the comprehensive underwriting process is retroactive to the policy issue date. Premiums may also be determined retroactively to the issue date based on the rating determined based on the results of the comprehensive underwriting process. In an embodiment, terms and conditions may provide that the insured may obtain a full refund of any premium paid at issue upon receipt of the rating resulting from the comprehensive underwriting process.

A policy generation system may generate the requested policy documents. The policies may issue on a same date. The policy documents may be printed and provided to a mailing system for mailing to the proposed insured. It will be appreciated that steps of review of the printed policy may be performed prior to mailing. Upon mailing of the policy, the policy comes into effect, and the proposed insureds becomes insured. The coverage under the binding premium receipt terminates simultaneously with the coming into effect of the policy. The insureds receive the policy, and learns that the policy is in effect.

In any embodiment, policy documents may be furnished to the insureds in a variety of manners. By way of example, the policy contracts, riders and other documents may be printed to one or more image files, such as a pdf or tiff format image files, which may be transmitted to the insured by e-mail transmission directly to the insureds or to the insureds' broker to furnish to the insured. The files may be made available on a server, such as on a secure server accessible via a browser using suitable credentials, such as a user identification and password. The address of the secure server, user identification and password may be furnished to the insureds via e-mail, fax transmission or other mode of transmission. The policy documents may be transmitted via facsimile to the insureds or to a broker or agent. The broker or agent may present the facsimile transmitted or e-mailed and printed policy documents to the insureds. The policies comes into effect upon furnishing of the policies to the insured. In cases where the insured and the policy owner are different persons, the policy comes into effect upon furnishing of the policy to the policy owner.

Figure 10:
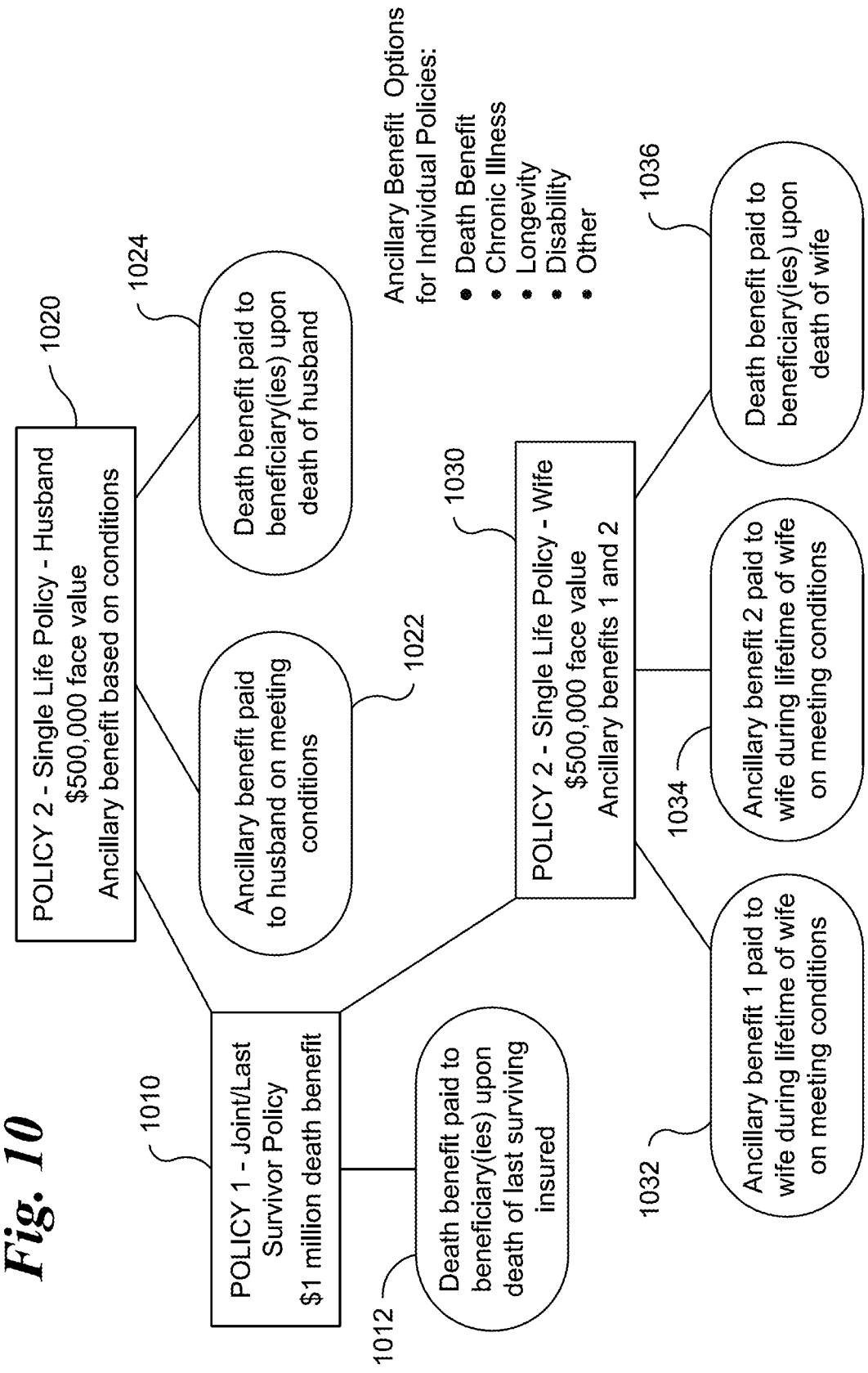
FIG. 10 is a diagram graphically depicting policies and ancillary benefits for use in connection with an embodiment.

Referring to FIG. 10, a diagrammatic representation is shown of an implementation involving planning for a husband and wife. Policy 1, indicated at 1005, is a last survivor life insurance policy in which both the husband and wife are insureds. The face value, or initial death benefit, is $1,000,000 in this example. The policy may be a universal or a whole life insurance policy. A term life policy with a sufficiently long term to provide a very low risk of both insureds outliving the policy (for example, a 50 year term policy purchased when the younger of the couple is age 60) may be employed rather than a universal or whole life policy. The death benefit under a whole life or a universal life policy is typically determined by a formula in which the death benefit is equal to the face value less policy indebtedness and plus cash value of the policy. This death benefit, as shown at 1010, is payable to a beneficiary or to multiple beneficiaries, as designated in the policy, upon the death of the last to die of the husband and wife. The death benefit provides the primary benefit of the policy, that of providing assets to beneficiaries, such as children or grandchildren, other relatives, or charitable institutions, when both the husband and wife have died.

Policy 2 is a life insurance policy 1020 in which the husband is the sole insured. Policy 2 has a face value of $500,000, and may be a universal or whole life insurance policy. The beneficiary under Policy 2 may be the wife, with a contingent beneficiary to receive the death benefit in the event the wife dies before or simultaneously with the husband. Policy 2 includes an ancillary benefit, which is any benefit other than or in addition to the death benefit. Ancillary benefits may include periodic payments based on a medical condition of the husband, disability payments based on the husband's inability to perform his occupation, periodic payments available once the husband reaches a minimum age, such as 90 or 95 years, and others. Upon the conditions being met for the ancillary benefit, the ancillary benefit is paid 1022 during the lifetime of the husband. The ancillary benefit may be payable to the husband or the wife. Upon the death of the husband, the death benefit 1024 is paid to the beneficiary or beneficiaries. The amount of the death benefit may be reduced from the face value of $500,000 based on payment of ancillary benefits.

Policy 3 is a life insurance policy 1030 in which the wife is the sole insured. Policy 3 has a face value of $500,000. The beneficiary under Policy 3 may be the husband, with a contingent beneficiary to receive the death benefit in the event the husband dies before or simultaneously with the husband. Policy 3 has ancillary benefits 1 and 2. Ancillary benefits 1 and 2 may include periodic payments based on a medical condition of the wife, disability payments based on the wife's inability to perform her occupation, periodic payments available once the wife reaches a minimum age beyond a specified age, such as 90 or 95 years, and others. Ancillary benefit 1 1032 is payable to the insured or the policy owner during the lifetime of the wife upon the conditions associated with that ancillary benefit being met. Ancillary benefit 2 1034 is payable to the insured or the policy owner during the lifetime of the wife and upon the conditions associated with that ancillary benefit being met. The death benefit 1036 under Policy 3 is payable to the beneficiary or beneficiaries upon the death of the wife. The payment of ancillary benefits may result in reduction of the amount of the death benefit 1036 for payment upon death of the wife.

Figure 11:
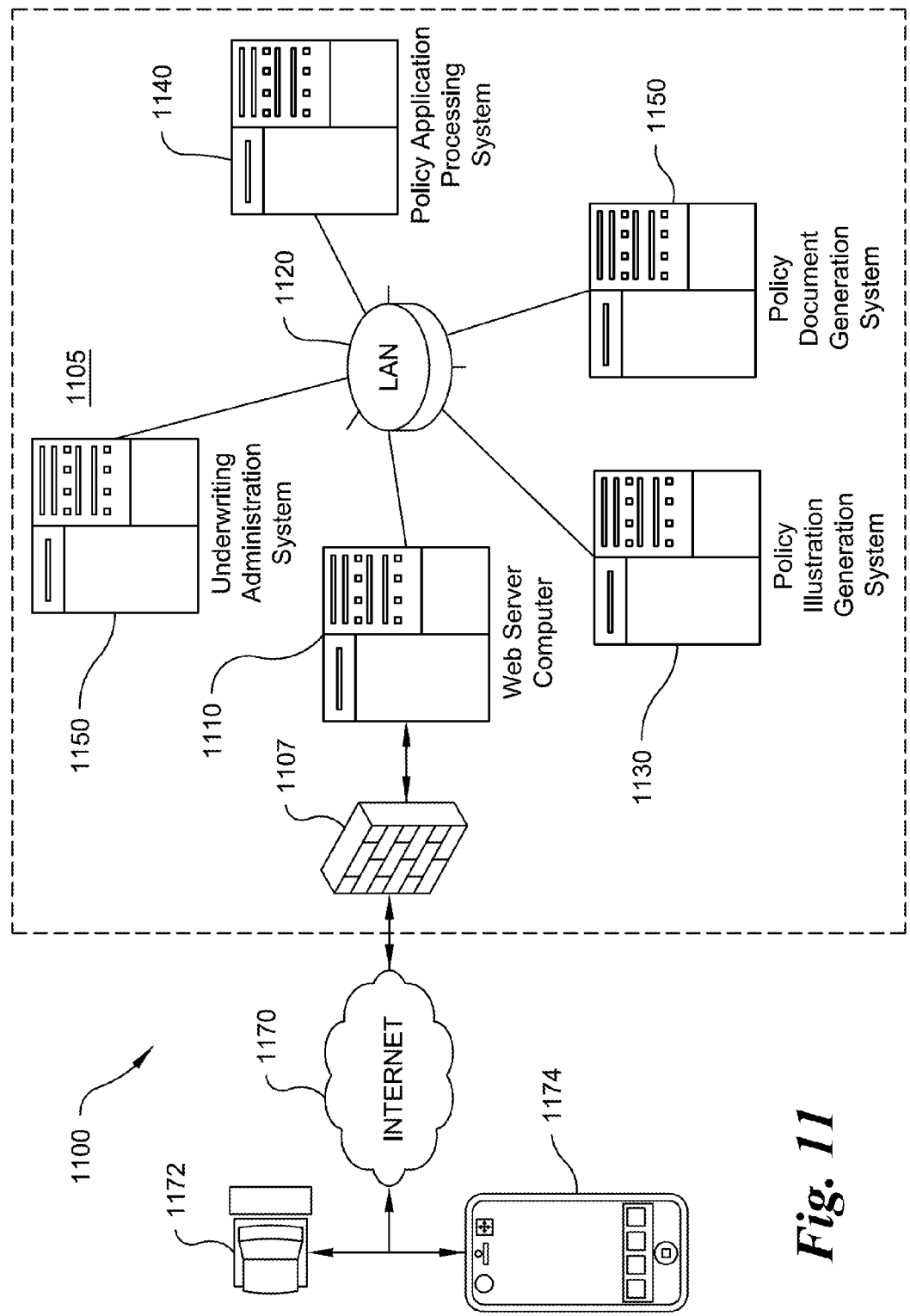
FIG. 11 is a schematic diagram showing systems within an insurance company computer system for implementing processing of data related to a tablet computer implementing an application program in connection with an embodiment.

Referring to FIG. 11, a computer system 1100 is illustrated for processing data related to last survivor life insurance policies having a death benefit payable on a death of a last to die of two or more insureds, one or more associated single life policies on the lives of one or more of the insureds and having one or more ancillary benefits. Computer system 1100 may be configured to implement processing of data related to policies and ancillary benefits illustrated in FIG. 10, for example. Computer system 1100 is configured showing an insurance company computer system 1105 in communication via firewall 1107 with Internet 1170, and devices and systems, such as desktop computer system 1172, smartphone 1174, and other exemplary user-accessible devices. Computer system 1100 includes web server system 1110 for rendering web pages based on data provided by other systems of insurance company computer system 1105. Web server system 1110 is in communication, via local area network 1120, with policy illustration generation system 1130, policy application processing system 1140 underwriting administration system 1150, and policy document generation system 1160. Policy illustration generation system 1130 is configured to generate data to be rendered by web server 1110 as questions or prompts to users of user-accessible devices 1172, 1174, for selections of policy face amounts and ancillary benefits, such as those discussed above in connection with FIG. 10. Policy application processing system 1140 may be configured to generate data to be rendered by web server 1110 as policy application forms including prompts and questions and to receive data and documents associated with applications for life insurance policies, and particularly life insurance policies including last survivor life insurance policies having a death benefit payable on a death of a last to die of two or more insureds, one or more associated single life policies on the lives of one or more of the insureds and having one or more ancillary benefits. Policy application processing system 1140 may be configured to employ data associated with the last survivor policy, such as insured names, gender, ages, addresses, medical information, and the like in the applications for the individual life insurance policies, thereby facilitating the application process for applicants and for the insurance company. Policy application processing system 1140 may be configured to pre-populate data fields with data relating to insureds, face amounts, and other applicable data, from policy illustration generation system 1130.

Underwriting administration system 1150 may be configured to administer the underwriting of policies upon receipt of applications. Underwriting administration system 1150 may be configured to perform tasks related to gathering and analyzing data in connection with underwriting of life insurance policies, and to assist insurance company underwriting personnel to perform tasks related to underwriting. Underwriting administration system 1150 may be configured to perform tasks for the multiple life insurance policies so as to avoid duplication, such as by combining requests for documents from applicants for insurance or their treating physicians applicable to more than one of the policies into a single request, populating data files for more than one of the policies with data received as to the insureds, combining tasks for underwriting personnel, such as scheduling appointments with medical technicians, applicable to multiple policies, and requiring completion of underwriting as to all policies before providing the results of underwriting as to any of the policies to applicants.

Policy document generation system 1160 may be configured to generate documents, including policy contracts and riders, from stored templates of documents, populated with data particular to policies to be issued. Upon completion of underwriting and receipt of any further approvals, policy document generation system 1160 may be instructed to generate policy documents for the multiple policies. Policy document generation system may assign consecutive policy numbers to the policies, populate the documents using common information as to insureds, owners, and the like, and generate the documents for printing and physical delivery by postal mail to insureds, as well as generating image files for posting to web server computer 1110 for access from user accessible devices 1172, 1174.

Figure 12:
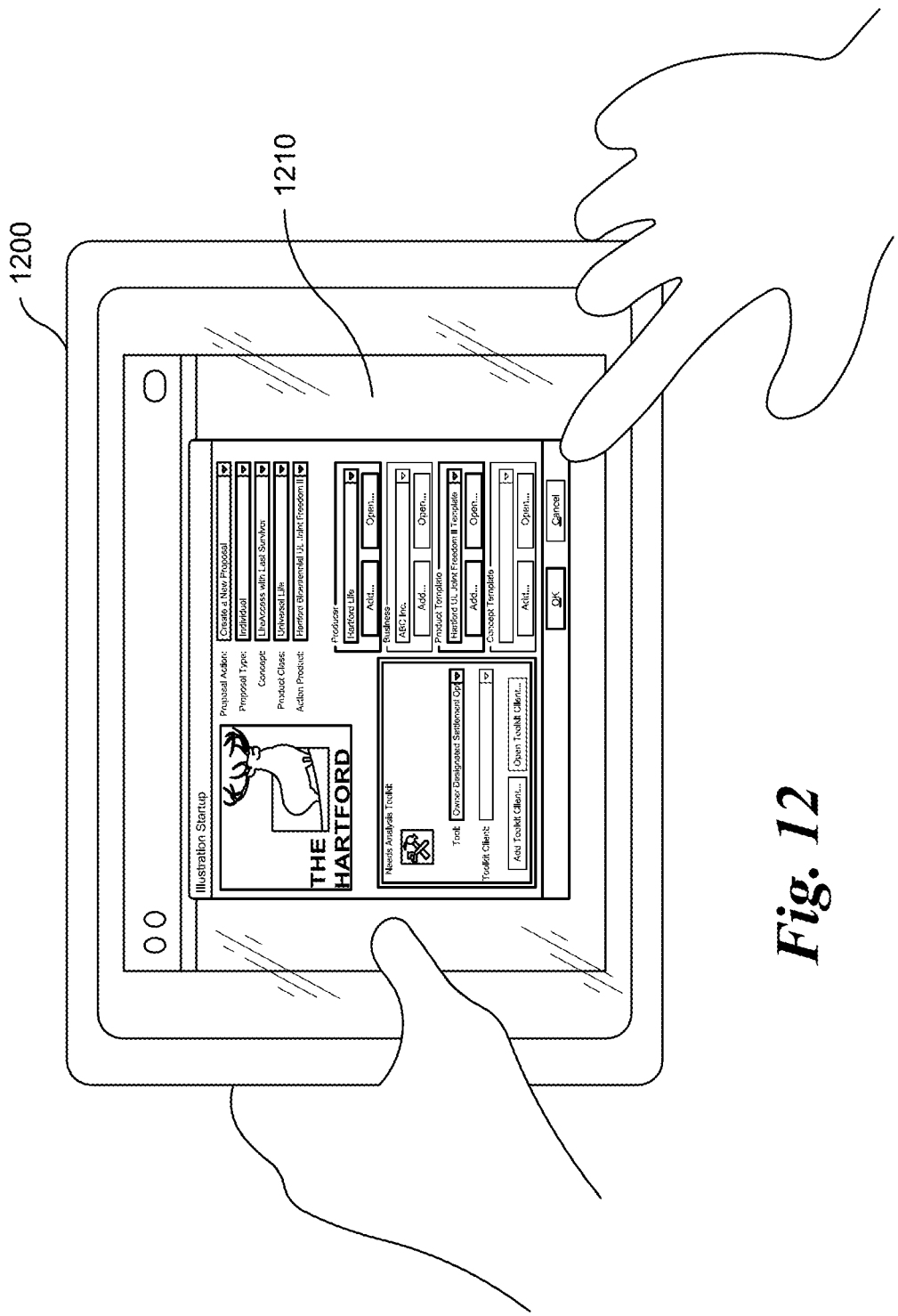
FIG. 12 is a representation of a tablet computer for implementation of an embodiment.

Referring to FIG. 12, a tablet computer 1200 is shown. Tablet computer 1200 may perform, either as a standalone device, or as part of a network, the functionality discussed in the present application, such as generation of illustrations, submission of applications for insurance, underwriting administration and generation and display of policy documents. Tablet computer 1200 may serve as an exemplary handheld wireless communications device. Such devices may include any device capable of bidirectional wireless communications via cellular telephone networks, wi-fi devices, two-way radio, or any other form of wireless communications, may be employed in an implementation. A handheld wireless communications device may be, in addition to tablet computer 1200, a cellular telephone, smart phone, personal digital assistant, notebook computer, or other type of wireless communications device with a display and processing capability. Via handheld wireless communications device 1200, a user may input data for generation of illustrations of policies as discussed herein, apply for last survivor life insurance policies and associated single life policies, which may be for issue prior to comprehensive underwriting, receive policy documents, including illustrations, binders, policies, and statements, authorize electronic payments of premiums, determine amounts of premiums necessary to qualify for a benefit, submit an application for a benefit, and receive statements related to the benefit, including amounts of periodic payments and adjustments to policy values, including death benefits.

In an embodiment, tablet computer 1200, or other handheld wireless communications device, may include a processor and memory device or memory devices in communication with the processor, as well as wireless antenna assemblies and one or more displays, such as touch screen display 1210, in communication with the processor. In an embodiment, a memory device of handheld wireless communications device has stored therein an application program including processor executable instructions for prompting a user to provide requested face value, rider and/or premium information for life insurance policies as discussed herein, receiving the information, accessing rate and other data, and generating illustrations, as discussed above. The application programs may prompt the user to provide responses to questions relating to health of the insureds, determine eligibility for insurance, receive confirmation of premium payment, provide an output signal to a system computer that eligibility has been confirmed, and receive and display policy documents generated by a policy generation system.

A processor may provide the central processing unit (CPU) functions of a computing device on one or more integrated circuits. The term "processor" may include multi-core processors and central processing units including multiple microprocessors.

In embodiments, a processor may provide an output signal having data indicative of one or more data items. An output signal may be carried either over a suitable medium, such as wire or fiber, or wirelessly. An output signal may transmit data from one device to another directly, such as over a bus of a computer system from a processor to a memory device, or indirectly, such as over multiple networks, and with intermediate steps of storage in a buffer or memory device and retransmission. Such an output signal may be provided by the processor to a bus of a computer system together with address data at a series of clock intervals. The address data may designate a destination device on a bus, by way of example. In embodiments, an output signal may be a signal output from a hardware communications device of a computer system to a network, such as a local area network, a wide area network, or a network of interconnected networks, such as the Internet. Output signals may include, by way of example, data identifying formats, fields, and content of fields. Signals may be compatible with any appropriate format. For example, data may be formatted in accordance with a data format for insurance data, such as an ACORD compatible format. Reference to an output signal having particular data may include one or more signals bearing the information. Multiple signals bearing the information may include sequences of digital data bearing the information interleaved with sequences of digital data relating to other information. By way of example, a signal may be packetized for transmission. By way of further example, an output signal may take the form of an uncompressed digital signal or a compressed digital signal.

A system on which the methods of embodiments of the present invention may be implemented includes at least one central processing computer or computer network server. Network server includes at least one controller or central processing unit (CPU or processor), at least one communication port or hub, at least one random access memory (RAM), at least one read-only memory (ROM) and one or more databases or data storage devices. All of these later elements are in communication with the CPU to facilitate the operation of the network server. The network server may be configured in many different ways. For example, a network server may be a conventional standalone server computer or alternatively, the function of server may be distributed across multiple computing systems and architectures.

A network server may also be configured in a distributed architecture, wherein databases and processors are housed in separate units or locations. Some such servers perform primary processing functions and contain at a minimum, a RAM, a ROM, and a general controller or processor. In such an embodiment, each of these servers is attached to a communications hub or port that serves as a primary communication link with other servers, client or user computers and other related devices. The communications hub or port may have minimal processing capability itself, serving primarily as a communications router. A variety of communications protocols may be part of the system, including but not limited to: Ethernet, SAP, SAS™, ATP, Bluetooth, GSM and TCP/IP.

Data storage device may include a hard magnetic disk drive, optical storage units, CD-ROM drives, or flash memory. Data storage devices contain databases used in processing transactions and/or calculations in accordance with embodiments of the present invention, including at least an insurance subscriber database and an insurance database. In one embodiment, database software creates and manages these databases. Insurance related calculations and/or algorithms in accordance with an embodiment of the present invention are stored in storage device and executed by the CPU.

The controller comprises a processor, such as one or more microprocessors and one or more supplementary co-processors such as math co-processors. The processor is in communication with a communication port through which the processor communicates with other devices such as other servers, user terminals or devices. The communication port may include multiple communication channels for simultaneous communication with, for example, other processors, servers or client terminals. As stated, devices in communication with each other need not be continually transmitting to each other. On the contrary, such devices need only transmit to each other as necessary, may actually refrain from exchanging data most of the time, and may require several steps to be performed to establish a communication link between the devices.

The processor also is in communication with a data storage device. The data storage device may comprise an appropriate combination of magnetic, optical and/or semiconductor memory, and may include, for example, RAM, ROM, flash drive, an optical disc such as a compact disc and/or a hard disk or drive. The processor and the data storage device each may be, for example, located entirely within a single computer or other computing device; or connected to each other by a communication medium, such as a USB port, serial port cable, a coaxial cable, an Ethernet type cable, a telephone line, a radio frequency transceiver or other similar wireless or wireline medium or combination of the foregoing.

The data storage device may store, for example, (i) a program (e.g., computer program code and/or a computer program product) adapted to or configured to direct the processor in accordance with embodiments of the present invention, and particularly in accordance with the processes described in detail hereinafter with regard to the controller; (ii) a database adapted to store information that may be utilized to store information required by the program. The program may be stored, for example, in a compressed, an uncompiled and/or an encrypted format, and may include computer program code. The instructions of the program may be read into a main memory of the processor from a non-transitory computer-readable medium other than the data storage device, such as from a ROM or from a RAM.

While execution of sequences of instructions in the program causes the processor to perform the process steps described herein, hard-wired circuitry may be used in place of, or in combination with, software instructions for implementation of the processes of embodiments of the present invention. Thus, embodiments of the present invention are not limited to any specific combination of hardware and software.

Suitable computer program code may be provided for performing numerous functions such as calculating a face value for the insurance product, calculating an account value for the insurance product, calculating a death benefit for the insurance product using the account value and the face value, calculating an accelerated benefit for the insurance product using the face value, and account value, and generating an insurance product having an account value, a face value, a death benefit, and a accelerated benefit. The functions described above are merely exemplary and should not be considered exhaustive of the type of function which may be performed by the computer program code of embodiments of the present inventions.

A computing system may include modules, which may be implemented in hardware, software, or combinations of software and hardware, operably inter-connected via a bi-directional connection with a central serial bus or other bus.

The computing system may be in communication with one or more payment systems for effecting payments to owners, insured and beneficiaries, such as payments of death benefits and ancillary benefits under policies.

The term "computer-readable medium" as used herein refers to any medium that provides or participates in providing instructions to the processor of the computing device (or any other processor of a device described herein) for execution. Such a medium may take many forms, including but not limited to, non-volatile media, non-transitory media, tangible media, volatile media, and transmission media. Non-volatile media and tangible media include, for example, optical or magnetic disks, such as memory. Volatile media include dynamic random access memory (DRAM), which typically constitutes the main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM or EEPROM (electronically erasable programmable read-only memory), a FLASH-EEPROM, any other memory chip or cartridge, a carrier wave as described hereinafter, or any other medium from which a computer can read.

Various forms of computer readable media may be involved in carrying one or more sequences of one or more instructions to the processor (or any other processor of a device described herein) for execution. For example, the instructions may initially be borne on a magnetic disk of a remote computer. The remote computer can load the instructions into its dynamic memory and send the instructions over an Ethernet connection, cable line, or even telephone line using a modem. A communications device local to a computing device (or, e.g., a server) can receive the data on the respective communications line and place the data on a system bus for the processor. The system bus carries the data to main memory, from which the processor retrieves and executes the instructions. The instructions received by main memory may optionally be stored in memory either before or after execution by the processor. In addition, instructions may be received via a communication port as electrical, electromagnetic or optical signals, which are exemplary forms of wireless communications or data streams that carry various types of information.

Servers of embodiments of the present invention may also interact and/or control one or more user devices or terminals. The user device or terminal may include any one or a combination of a personal computer, a mouse, a keyboard, a computer display, a touch screen, LCD, voice recognition software, or other generally represented by input/output devices required to implement the above functionality. The program also may include program elements such as an operating system, a database management system and "device drivers" that allow the processor to interface with computer peripheral devices (e.g., a video display, a keyboard, a computer mouse, etc).

While particular embodiments of the invention have been illustrated and described herein, various modifications and combinations can be made without departing from the spirit and scope of the invention, and all such modifications, combinations, and equivalents are intended to be covered and claimed.

What is claimed is:

1. A computer system for processing data related to last survivor life insurance policies having a death benefit payable on a death of a last to die of two or more insureds, and one or more associated single life policies on the lives of one or more of the insureds and having one or more ancillary benefits payable on an occurrence of an event other than death of the one or more of the insureds, comprising:
   a data storage device storing data indicative of rates and corresponding death benefit amounts for last survivor policies and individual life insurance policies based on age and gender of insureds, and rates and available benefit amounts associated with each of the ancillary benefits, the ancillary benefits comprising a withdrawal benefit in the nature of periodic payments payable from a company to the policy owner upon request and on condition of:
      the insured being living;
      the insured having reached a minimum age achieved at a benefit eligibility date; and
      a policy protection account having at least a target balance, wherein each payment reducing the amount of the death benefit until a residual death benefit amount is reached;
   a user accessible device in communication with the data storage device; and
   a processor in communication with the data storage device and the user accessible device, the processor configured to:
      in response to authenticating a user of the computer system, cause the user accessible device to prompt for face value amounts or a premium amount to be paid, age and gender of the two or more insureds, and user selection of the one or more ancillary benefits;
      receive via the user accessible device data indicative of a user selection of a premium amount or face value amounts, age and gender of the two or more insureds, and the one or more ancillary benefits;
      determine, based on the received data, face value amounts or premium amounts for at least two policies including a last survivor life insurance policy and the one or more individual life policies having the selected one or more ancillary benefits;
      generate and display on the user accessible device illustrations for each of the policies; and
      cause the user-accessible device to prompt for a single premium amount for payment on issue of each of the life insurance policies.

2. The computer system of claim 1, wherein the one or more ancillary benefits further comprises a benefit in the nature of periodic payments that reduce the death benefit amount conditioned on receipt of a certification that the insured has a loss of at least two abilities of daily living or severe cognitive impairment.

3. The computer system of claim 1, wherein the one or more ancillary benefits further comprise a benefit in the nature of a disability benefit payable on condition of a disability preventing an insured from performing occupational duties.

4. The computer system of claim 1, wherein the processor is further configured to employ iterative calculations to determine face value amounts for the policies.

5. The computer system of claim 1, wherein the processor is further configured to determine the face value amounts or premium amounts by calculating, using at least the stored data for rider rates and cost of insurance data, and assuming no policy loans, whether stored conditions for eligibility for a withdrawal benefit will be met by a benefit eligibility date.

6. The computer system of claim 1, wherein the processor is further configured to determine projected policy protection account balances based on a schedule of projected premium payments, charges based on policy face value, interest credited on balances and charges based on riders;
   determine, based on the policy protection account balances, the schedule of premium payments, and the benefit eligibility date, whether premium payments in accordance with the schedule will cause the policy protection account balance to reach a target balance by the benefit eligibility date; and
   responsive to determining that the policy protection account balance will not reach the target balance by the benefit eligibility date, recalculate the projected policy protection account balances employing a different premium schedule or a different policy face amount.

7. A computer-implemented method for processing data related to last survivor life insurance policies having a death benefit payable on a death of a last to die of two or more insureds, and one or more associated single life policies on the lives of one or more of the insureds and having one or more ancillary benefits, comprising:
   in response to authenticating a user of a computer system, causing, by a policy illustration generation system, a user accessible device in communication with the policy illustration generation system to prompt for face value amounts or a premium amount to be paid, age and gender of the two or more insureds, and one or more ancillary benefits, for at least two policies including a last survivor life insurance policy having a death benefit payable on a death of a last to die of two or more insureds, and one or more associated single life policies on the lives of one or more of the insureds, the one or more ancillary benefits comprising a withdrawal benefit in the nature of periodic payments payable from a company to the policy owner upon request and on condition of:
      the insured being living;
      the insured having reached a minimum age achieved at a benefit eligibility date; and
      a policy protection account having at least a target balance, wherein each payment reducing the amount of the death benefit until a residual death benefit amount is reached;

receiving at the policy illustration generation system via the user accessible device, responsive to the prompting, data indicative of a user selection of a premium amount or face value, age and gender of the two or more insureds, and at least one selected ancillary benefit payable on an occurrence of an event other than death of the one or more of the insureds, determining by the policy illustration generation system, based on the received data and stored data indicative of insurance rates and rates for the at least one selected ancillary benefit, face value amounts or premium amounts for the policies, at least one of the one or more individual life policies including the at least one selected ancillary benefit;

generating by the policy illustration generation system illustrations for each of the policies, and transmitting the illustrations to the user accessible device;

receiving by a policy application processing system via the policy illustration generation system and the user accessible device data for applications for the policies, the policy application processing system employing common data relating to the two or more insureds in the applications;

receiving, responsive to completed applications for the policies, by an underwriting administration system, data relating to the policies, and processing by the underwriting administration system data relating to the policies, the underwriting application system employing common data relating to the two or more insureds; and generating, by a policy document generation system, responsive to receipt of data indicating underwriting approval, policy contracts and riders for the policies, the policy contracts providing for issue of the policies on a same day.

8. The computer-implemented method of claim 7, wherein the one or more ancillary benefits further comprise a benefit in the nature of periodic payments that reduce the death benefit amount conditioned on receipt of a certification that the insured has a loss of at least two abilities of daily living or severe cognitive impairment.

9. The computer-implemented method of claim 8, wherein the last survivor policy is for two and only two insureds, and the one or more associated single life policies are two single life policies on the lives of the two and only two insureds.

10. The computer-implemented method of claim 8, wherein the last survivor policy and the one or more associated single life policies are universal life policies having a policy protection account, and the determining of the face value amounts or premium amounts for the policies comprises determining projected policy protection account balances based on a schedule of projected premium payments, charges based on policy face value, interest credited on projected policy protection account balances and charges based on the selected one or more ancillary benefits.

11. The computer-implemented method of claim 7, wherein the one or more selected ancillary benefits are implemented as one or more riders on the one or more associated single life policies.

12. The computer-implemented method of claim 7, wherein the prompting comprises prompting the user for selection of a single premium amount or a level premium amount and a term of years for payment of level premiums, the term being between 5 years and 20 years, inclusive.

13. The computer-implemented method of claim 7, wherein the prompting comprises prompting the user for face value amounts for the last survivor policy and the one or more single life policies.

14. A non-transitory computer-readable medium, the non-transitory computer-readable medium having processor-executable instructions stored thereon, which instructions, when executed by the processor, cause the processor to:

access data related to a last survivor life insurance policy having a death benefit payable on death of a last to die of at least two insureds, and at least one associated single life policy having a death benefit payable on death of one of the at least two insureds and one or more ancillary benefits payable on an occurrence of an event other than death of the one of the at least two insureds, the one or more ancillary benefits comprising a withdrawal benefit in the nature of periodic payments payable from a company to the policy owner upon request and on condition of:

the insured being living;

the insured having reached a minimum age achieved at a benefit eligibility date; and a policy protection account having at least a target balance, wherein each payment reducing the amount of the death benefit until a residual death benefit amount is reached;

in response to authenticating a user of a computer system, cause a user accessible device to prompt for face value amounts or a premium amount to be paid, age and gender of the two or more insureds, and user selection of the one or more ancillary benefits;

receive, responsive to the prompts, data indicative of premium amount or face value, data relating to mortality of the two or more insureds, and the user selection of the one or more ancillary benefits;

determine, based on the received data, face value amounts or premium amounts for at least two policies including a last survivor life insurance policy and the one or more individual life policies having the selected one or more ancillary benefits;

generate and transmit for display on the user accessible device illustrations for each of the policies; and cause the user-accessible device to prompt for a single premium amount for payment on issue of each of the life insurance policies.

15. The non-transitory computer-readable medium of claim 14, wherein the one or more ancillary benefits further comprise at least one of: a benefit in the nature of periodic payments that reduce the death benefit amount based on a medical condition of an insured; periodic payments based on longevity of an insured past a predetermined age or date, and periodic payments based on an insured having a disability preventing the insured from performing occupational duties.

16. The non-transitory computer-readable medium of claim 14, wherein the prompting comprises prompting for face value amounts for each the last survivor policy and two and only two single life policies.

17. The non-transitory computer-readable medium of claim 14, wherein the policies are universal life policies.

18. The non-transitory computer-readable medium of claim 14, wherein the instructions further cause the processor to, prompt the user for data relating to health conditions of the two or more insureds, and determine whether the two or more insureds are eligible for life insurance in real time, responsive to receipt of the data relating to health conditions.

19. A computer system for processing data related to last survivor life insurance policies having a death benefit payable on a death of a last to die of two or more insureds, and one or more associated single life policies on the lives of one or more of the insureds and having one or more ancillary benefits, comprising the following networked systems:

a policy illustration generation system configured to:
  authenticate a user;
  receive data indicative of selections of the user, wherein the selections comprise:
    face value amounts or a premium amount to be paid;
    an age and a gender of the two or more insureds; and
    one or more ancillary benefits payable on an occurrence of an event other than death of the one or more of the insureds, for at least two policies including a last survivor life insurance policy having a death benefit payable on a death of a last to die of two or more insureds, and one or more associated single life policies on the lives of one or more of the insureds having the one or more ancillary benefits;
  determine a corresponding premium amount or face value based on the selections; and
  generate illustrations for each of the policies for transmission and display to a user, the one or more ancillary benefits comprising a withdrawal benefit in the nature of periodic payments payable from a company to the policy owner upon request and on condition of:
    the insured being living;
    the insured having reached a minimum age achieved at a benefit eligibility date; and
  a policy protection account having at least a target balance, wherein each payment reducing the amount of the death benefit until a residual death benefit amount is reached;
a policy application processing system configured to receive, via the policy illustration generation system, data for applications for the policies, and to employ common data relating to the two or more insureds in the applications;
an underwriting administration system configured to administer underwriting for the policies, employing common data relating to the two or more insureds; and
a policy document generation system configured to generate policy documents for the policies, the policy documents providing for issue of the policies on a same day.

20. The computer system of claim 19, wherein the common data relating to the two or more insureds comprises health data.

21. The computer system of claim 19, wherein the policy document generation system is configured to generate policy documents comprising riders to implement the one or more ancillary benefits.

22. The computer system of claim 19, wherein the system is further configured to prompt users for data relating to health conditions of the two or more insureds, and to determine in real time whether each of the two or more insureds is eligible for issue of a policy prior to completion of comprehensive underwriting.

* * * * *